United States Patent
Xie et al.

(10) Patent No.: US 12,407,741 B2
(45) Date of Patent: Sep. 2, 2025

(54) METHOD AND APPARATUS FOR MULTICAST SERVICE SESSION OPERATION AND COMMUNICATIONS DEVICE

(71) Applicant: VIVO MOBILE COMMUNICATION CO., LTD., Guangdong (CN)

(72) Inventors: Zhenhua Xie, Chang'an Dongguan (CN); Xiaowan Ke, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 451 days.

(21) Appl. No.: 17/841,403

(22) Filed: Jun. 15, 2022

(65) Prior Publication Data

US 2022/0312156 A1 Sep. 29, 2022

Related U.S. Application Data

(63) Continuation of application No. PCT/CN2020/141891, filed on Dec. 31, 2020.

(30) Foreign Application Priority Data

Jan. 2, 2020 (CN) .......................... 202010003202.7

(51) Int. Cl.
*H04W 4/06* (2009.01)
*H04L 65/611* (2022.01)
(Continued)

(52) U.S. Cl.
CPC .............. *H04L 65/611* (2022.05); *H04W 4/06* (2013.01); *H04W 76/40* (2018.02); *H04L 12/189* (2013.01)

(58) Field of Classification Search
CPC ................................ H04W 4/06; H04W 76/40
See application file for complete search history.

(56) References Cited

U.S. PATENT DOCUMENTS

2002/0009073 A1 1/2002 Furukawa et al.
2009/0196213 A1 8/2009 Zhong et al.
(Continued)

FOREIGN PATENT DOCUMENTS

| CN | 1450750 A | 10/2003 |
|---|---|---|
| CN | 101094443 A | 12/2007 |

(Continued)

OTHER PUBLICATIONS

Huawei Technologies Co., Ltd, "session establishment for IMS initiated and controlled MBMS user service in multicast mode," 3GPP TSG-SA4 AdHoc Meeting, Tdoc S4-AHI-007, pp. 1-3, (May 2008).

(Continued)

*Primary Examiner* — Zhiren Qin
(74) *Attorney, Agent, or Firm* — BROOKS KUSHMAN P.C.

(57) ABSTRACT

Embodiments of the present invention provide a method and an apparatus for multicast service session operation and a communications device, where the method for multicast service session operation includes: receiving from a terminal a request including multicast service information; and sending a first invocation parameter to a second network function, where the first invocation parameter is used for invoking a multicast context service operation of the second network function.

17 Claims, 11 Drawing Sheets

---

Receive from a terminal a request including multicast service information — 201

Send a first invocation parameter to a second network function — 202

(51) Int. Cl.
*H04W 76/40* (2018.01)
*H04L 12/18* (2006.01)

(56) References Cited

U.S. PATENT DOCUMENTS

| | | |
|---|---|---|
| 2018/0255435 A1 | 9/2018 | Li et al. |
| 2021/0022063 A1 | 1/2021 | Yang et al. |
| 2021/0051474 A1* | 2/2021 | Dao ................ H04L 12/185 |
| 2021/0067958 A1* | 3/2021 | Lee ................. H04W 12/106 |
| 2021/0219106 A1* | 7/2021 | Li .................... H04W 60/04 |
| 2022/0263879 A1* | 8/2022 | Li .................... H04L 12/1407 |

FOREIGN PATENT DOCUMENTS

| | | |
|---|---|---|
| CN | 101163260 A | 4/2008 |
| CN | 107396323 A | 11/2017 |
| EP | 3 764 696 A1 | 1/2021 |
| EP | 4 044 614 A1 | 8/2022 |
| JP | 2010-063119 A | 3/2010 |
| WO | 2017/075792 A1 | 5/2017 |
| WO | 2019/196608 A1 | 10/2019 |
| WO | 2019/223005 A1 | 11/2019 |
| WO | 2019/223780 A1 | 11/2019 |

OTHER PUBLICATIONS

3rd Generation Partnership Project; Technical Specification Group Services and System Aspects; Multimedia Broadcast/Multicast Service (MBMS); Architecture and functional description (Release 16), 3GPP TS 23.246, V16.1.0 pp. 1-5, (Sep. 2019).

Huawei et al., "Solution to KI1: Establishment of MBS session for multicast," SA WG2 Meeting #136, S2-1911645, pp. 1-3, (Nov. 2019).

Written Opinion of the International Searching Authority dated Mar. 9, 2021 as received in Application No. PCT/CN2020/141891.

CN Office Action dated Oct. 26, 2021 as received in Application No. 202010003202.7.

IN Patent Examination Report dated Nov. 29, 2022 as received in Application No. 202227036057.

Extended European Search Report dated Dec. 2, 2022 as received in Application No. 20910922.2.

Qualcomm Incorporated, Solution: Integrated MBS and Unicast Transport with Full Separation of MBS Service, S2-1911371, SA WG2 Meeting #136, Reno, Nevada, Nov. 18-22, 2019.

Japanese Office Action issued in corresponding application No. 2022-540964, dated Jul. 31, 2023.

First Office Action for Korean Application No. 10-2022-7026473, dated Mar. 26, 2024, 7 Pages.

3GPP "3rd Generation Partnership Project; Technical Specification Group Services and System Aspects; Study on architecture enhancements for EPS and 5G System to support advanced V2X services (Release 16)" 3GPP TR 23.786 V2.0.0 (Mar. 2019), 2019, 119 Pages.

3GPP "3rd Generation Partnership Project; Technical Specification Group Services and System Aspects; Multimedia Broadcast/ Multicast Service (MBMS); Architecture and functional description (Release 15)" 3GPP TS 23.246 V15.1.0 (Sep. 2019), 2019, 77 Pages.

* cited by examiner

METHOD AND APPARATUS FOR MULTICAST SERVICE SESSION OPERATION AND COMMUNICATIONS DEVICE

CROSS-REFERENCE TO RELATED APPLICATIONS

This application is a continuation application of PCT International Application No. PCT/CN2020/141891 filed on Dec. 31, 2020, which claims a priority to Chinese Patent Application No. 202010003202.7 filed with China on Jan. 2, 2020, which is incorporated herein by reference in its entirety.

TECHNICAL FIELD

The present invention relates to the field of communication technologies, and in particular, to a method and an apparatus for multicast service session operation and a communications device.

BACKGROUND

In the prior art, multicast services are provided based on network elements. However, a core network of a fifth-generation mobile communication technology (5th-Generation, 5G) network adopts a service-based architecture based on network functions, and provides services no longer based on network elements having complete software and hardware, but based on network functions in the form of software. Therefore, multicast services are currently unable to operate on a network using a service-based architecture that is based on network functions.

SUMMARY

Embodiments of the present invention provide a method and an apparatus for multicast service session operation and a communications device to solve the problem that multicast services are currently unable to operate on a network using a service-based architecture that is based on network functions.

To resolve the foregoing technical problem, the embodiments of the present invention are implemented as follows:

According to a first aspect, an embodiment of the present invention provides a method for multicast service session operation, applied to a first network function of a communications device, including:
receiving from a terminal a request including multicast service information; and
sending a first invocation parameter to a second network function, where the first invocation parameter is used for invoking a multicast context service operation of the second network function.

According to a second aspect, an embodiment of the present invention provides a method for multicast service session operation, applied to a second network function of a communications device, including:
sending a multicast service operation result to a terminal.

According to a third aspect, an embodiment of the present invention provides a method for multicast service session operation, applied to a third network function of a communications device, including:
receiving a second invocation parameter sent by a second network function, where the second invocation parameter is used for invoking an authorization service operation of the third network function, and the second invocation parameter includes multicast service information; and
sending a second invocation result to the second network function.

According to a fourth aspect, an embodiment of the present invention provides an apparatus for multicast service session operation, applied to a first network function of a communications device, including:
a first receiving module, configured to receive from a terminal a request including multicast service information; and
a first sending module, configured to send a first invocation parameter to a second network function, where the first invocation parameter is used for invoking a multicast context service operation of the second network function.

According to a fifth aspect, an embodiment of the present invention provides an apparatus for multicast service session operation, applied to a second network function of a communications device, including:
a third sending module, configured to send a multicast service operation result to a terminal.

According to a sixth aspect, an embodiment of the present invention provides an apparatus for multicast service session operation, applied to a third network function of a communications device, including:
a fifth receiving module, configured to receive a second invocation parameter sent by a second network function, where the second invocation parameter is used for invoking an authorization service operation of the third network function, and the second invocation parameter includes multicast service information; and
a sixth sending module, configured to send a second invocation result to the second network function.

According to a seventh aspect, an embodiment of the present invention provides a communications device, including a memory, a processor, and a computer program stored in the memory and capable of running on the processor, where when the computer program is executed by the processor, the steps of the foregoing method for multicast service session operation can be implemented.

According to an eighth aspect, an embodiment of the present invention further provides a computer-readable storage medium, where a computer program is stored in the computer-readable storage medium, and when the computer program is executed by a processor, the steps of the foregoing method for multicast service session operation are implemented.

Based on the solutions disclosed in the embodiments of the present invention, multicast services are able to operate on a network using a service-based architecture that is based on network functions.

BRIEF DESCRIPTION OF DRAWINGS

To describe the technical solutions in the embodiments of the present invention more clearly, the following briefly describes the accompanying drawings required in the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF EMBODIMENTS

To describe the technical solutions in the embodiments of the present invention more clearly, the following briefly describes the accompanying drawings required in the embodiments of the present invention. Apparently, the accompanying drawings in the following description show merely some embodiments of the present invention, and a person of ordinary skill in the art may still derive other drawings from these accompanying drawings without creative efforts.

In the embodiment of the present invention, a communications device may be a terminal or a core network device. The terminal may also be referred to as a terminal device or user equipment (UE). The terminal may be a terminal side device such as a mobile phone, a tablet personal computer, a laptop computer, a personal digital assistant (PDA), a mobile internet device (MID), a wearable device, or an in-vehicle device. It should be noted that the specific type of the terminal is not limited in the embodiments of the present invention.

The core network device includes a network function (Network Function, NF, or referred to as a network function entity). The network function may include but is not limited to: an access management function (AMF), a session management function (SMF), a user plane function (UPF), a multicast broadcast policy control function (MBPCF), a multicast broadcast session management (MBSF), a multicast broadcast user plane function (MBUF), and the like.

In the embodiments of the present invention, terminal and user are different concepts. A user may be understood as an owner or user of a terminal.

In the embodiments of the present invention, a multicast function can be decomposed into three NFs: (1) MBSF, which is responsible for multicast session user context management; (2) MBUF, which is responsible for multi-copy forwarding of multicast data; and (3) MBPCF, which is responsible for user and quality of service authorization for multicast.

Figure 1:
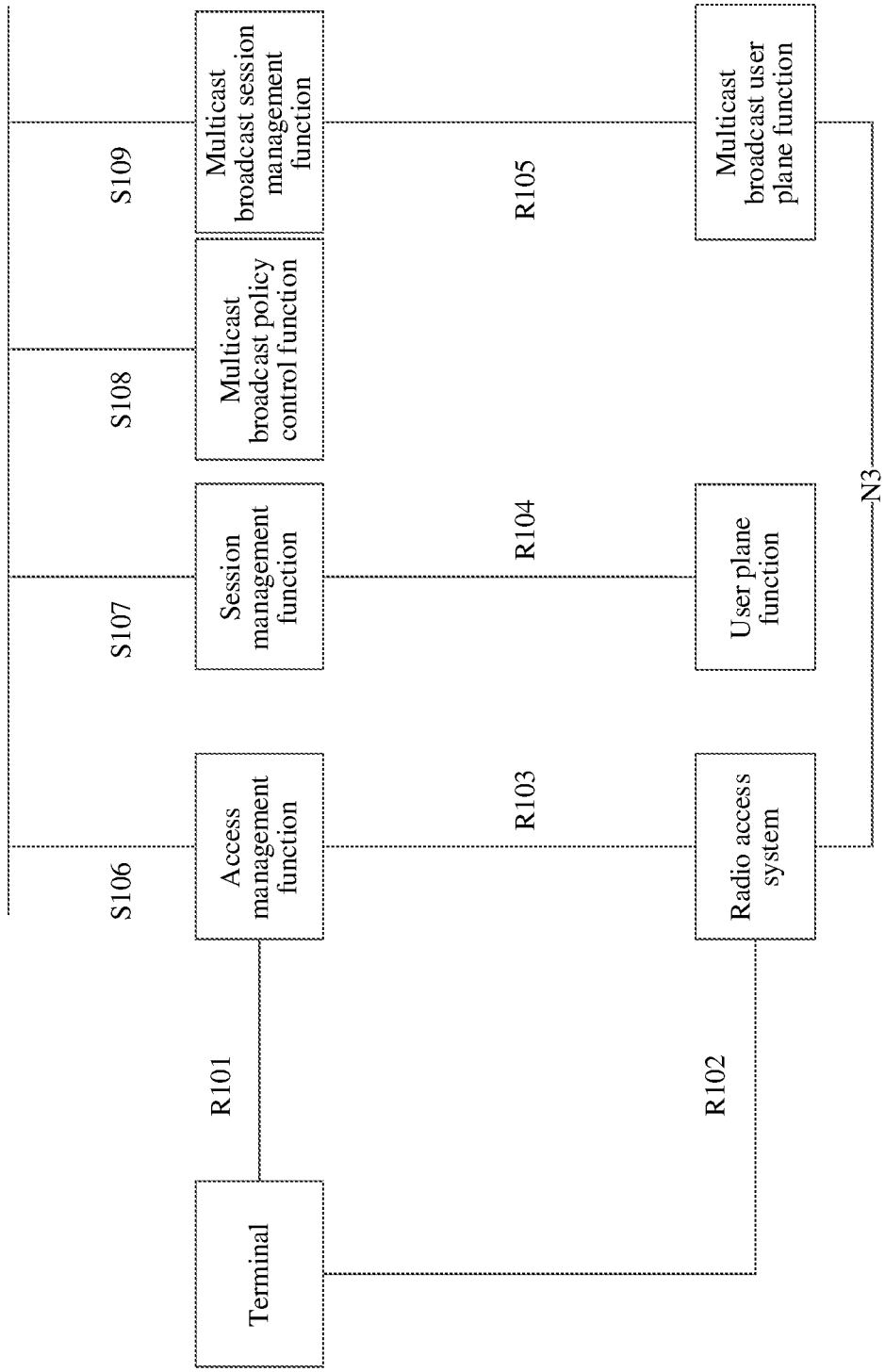
FIG. 1 is a schematic diagram of a functional architecture of multicast services according to an embodiment of the present invention.

For ease of understanding of the embodiments of the present invention, network functions involved in multicast services are described below with reference to FIG. 1. As shown in FIG. 1, interfaces and service invocations corresponding to the network functions may include:

interface R101: signaling exchange between UE and an AMF;

interface R102: signaling and data exchange between UE and a radio access system (RAN), that is, a base station system;

interface R103: signaling exchange between a RAN and an AMF;

interface R104: control signaling exchange between a UPF and an SMF;

interface R105: control signaling exchange between an MBUF and an MBSF;

service-based invocation S106: various access management related services opened by an AMF for invocation by other NFs;

service-based invocation S107: various session management related services opened by an SMF for invocation by other NFs;

service-based invocation S108: various multicast broadcast policy control related services opened by an MBPCF for invocation by other NFs; and service-based invocation S109: various multicast broadcast session management related services opened by an MBSF for invocation by other NFs.

Figure 2:
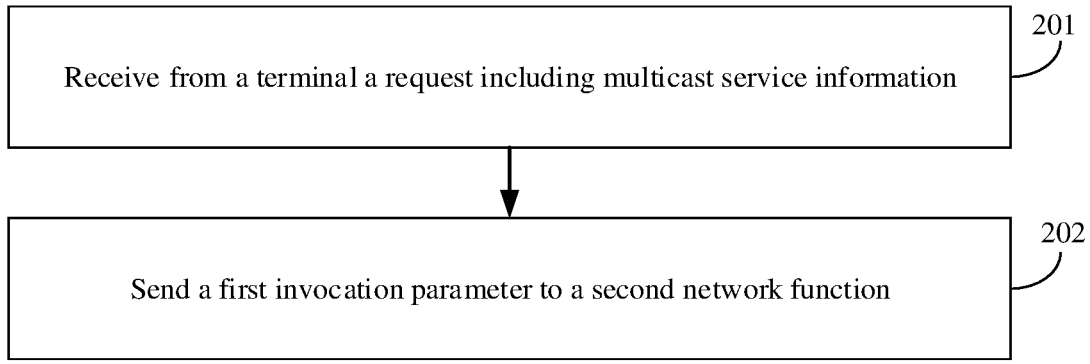
FIG. 2 is a first flowchart of a method for multicast service session operation according to an embodiment of the present invention.

Referring to FIG. 2, FIG. 2 is a flowchart of a method for multicast service session operation according to an embodiment of the present invention. The method is applied to a first network function of a communications device. The first network function may be optionally an AMF or an SMF. As shown in FIG. 2, the method includes the following steps.

Step 201: Receive from a terminal a request including multicast service information.

In this embodiment, the request may include any one of the following:

a multicast session establishment request message;

a first data packet for requesting to join a corresponding multicast group, where the first data packet is, for example, an IP packet;

a multicast session release request message; and a second data packet for requesting to leave a corresponding multicast group, where the second data packet is, for example, an IP packet.

Optionally, the multicast session establishment request message may include at least one of the following: multicast service information, indication information for indicating establishment of a multicast session, and quality of service capability information supported by the terminal (for example, a supported maximum data reception rate and a supported minimum packet loss rate). The multicast session release request message may include at least one of the following: multicast service information, indication information for indicating release of a multicast session, and quality of service capability information supported by the terminal (for example, a supported maximum data reception rate and a supported minimum packet loss rate). The first data packet or the second data packet is, for example, an IP packet which takes a format defined by a multicast group protocol, for example, Internet Group Management Protocol (IGMP) or Multicast Listening Discovery Protocol (MLD). A destination of the packet is, for example, a multicast service address, for example, Multicast IP.

Step 202: Send a first invocation parameter to a second network function.

The first invocation parameter is used for invoking a multicast context service operation of the second network function. The second network function is optionally but not limited to any one of the following: an MBSF, a network function integrating an MBSF and an MBPCF, and the like.

Further, the first invocation parameter may be specifically used for any of the following:

invoking a multicast context user add service operation of the second network function; and invoking a multicast context user delete service operation of the second network function.

Further, the first invocation parameter may include at least one of the following:

operation type indication information, where the operation type indication information is used to indicate any one of the following: user add, user delete, multicast session establishment, and multicast session release;

multicast service information, where the multicast service information is received from the terminal;

quality of service capability information, where the quality of service capability information is received from the terminal; and information about a RAN node serving the UE.

Optionally, the multicast service information may include at least one of the following: a multicast service address, a multicast group identifier, and a uniform resource locator.

Optionally, after step 202, the method may further include: receiving a first invocation result returned by the second network function; and sending a multicast service operation result to the terminal according to the first invocation result, or refusing to send information to the terminal, according to the first invocation result.

Optionally, the first invocation result may include at least one of the following: a multicast group identifier, information for notifying a RAN to create or update a radio resource, and a multicast service operation result.

Optionally, the multicast service operation result may include any one of the following:

a multicast session establishment success message;

a multicast session establishment failure message;

multicast service activation information;

multicast service deactivation information; and information that leaving a multicast session is allowed.

In an implementation, the AMF (or SMF) may send the first invocation parameter to the MBSF after receiving a multicast session establishment request message from UE, so as to invoke a multicast context user add service operation of the MBSF and receive the first invocation result returned by the MBSF. Further, according to the first invocation result, the AMF (or SMF) may send a multicast session establishment response message to the UE, where the response message is, for example, a multicast session establishment success message or a multicast session establishment failure message; or may refuse to send information to the UE.

In another implementation, the AMF (or SMF) may send the first invocation parameter to the MBSF after receiving a multicast session release request message from UE, so as to invoke a multicast context user delete service operation of the MBSF and receive the first invocation result returned by the MBSF. Further, according to the first invocation result, the AMF (or SMF) may send a multicast session release response message to the UE, for example, information that leaving a multicast session is allowed; or may refuse to send information to the UE.

In another implementation, the AMF (or SMF) may send the first invocation parameter to the MBSF after receiving from UE an IP data packet for requesting to join a corresponding multicast group, so as to invoke a multicast context user add service operation of the MBSF and receive the first invocation result returned by the MBSF. Further, according to the first invocation result, the AMF (or SMF) may send multicast service activation information to the UE; or may refuse to send information to the UE.

In another implementation, the AMF (or SMF) may send the first invocation parameter to the MBSF after receiving from UE an IP data packet for requesting to leave a corresponding multicast group, so as to invoke a multicast context user delete service operation of the MBSF and receive the first invocation result returned by the MBSF. Further, according to the first invocation result, the AMF (or SMF) may send multicast service deactivation information to the UE; or may refuse to send information to the UE.

It is not difficult to understand that with the solution disclosed in this embodiment, multicast services are able to operate on a network using a service-based architecture that is based on network functions.

Figure 3:
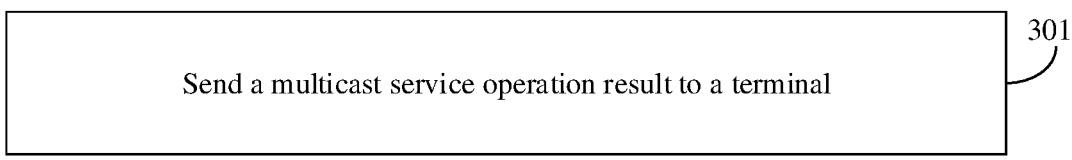
FIG. 3 is a second flowchart of a method for multicast service session operation according to an embodiment of the present invention.

Referring to FIG. 3, FIG. 3 is a flowchart of another method for multicast service session operation according to an embodiment of the present invention. The method is applied to a second network function of a communications device. The second network function is optionally but not limited to any one of the following: an MBSF, a network function integrating an MBSF and an MBPCF, a network function integrating an MBSF and an AMF, a network function integrating an MBSF and an SMF, and the like. As shown in FIG. 3, the method may include the following steps.

Step 301: Send a multicast service operation result to a terminal.

In this embodiment, the multicast service operation result may include any one of the following:

a multicast session establishment success message;

a multicast session establishment failure message;

multicast service activation information;

multicast service deactivation information; and information that leaving a multicast session is allowed.

Optionally, before step 301, the method may further include: receiving from the terminal a request including multicast service information. The request is, for example, a multicast session establishment request message or a multicast session release request message. In this case, the second network function is, for example, a network function integrating an MBSF and an AMF, or a network function integrating an MBSF and an SMF.

Optionally, before step 301, the method may further include: receiving a first invocation parameter sent by the first network function. The first network function is, for example, an AMF or an SMF. The first invocation parameter is used for invoking a multicast context service operation of the second network function. In this case, the second network function is, for example, an MB SF, or a network function integrating an MBSF and an MBPCF.

In an implementation, the first invocation parameter may be specifically used for any one of the following: invoking a multicast context user add service operation of the second network function; and invoking a multicast context user delete service operation of the second network function.

Further, after the receiving a first invocation parameter sent by a first network function, the second network function may further send the multicast service operation result to the terminal via the first network function. In this case, the first network function is, for example, an AMF or an SMF. The second network function is, for example, an MBSF, or a network function integrating an MBSF and an MBPCF.

Optionally, before step 301, the method may further include: sending a second invocation parameter to a third network function, and receiving a second invocation result sent by the third network function. The second invocation parameter is used for invoking an authorization service operation of the third network function. The third network function is, for example, an MBPCF. The second invocation result can be understood as an authorization result, indicating that authorization succeeds or authorization fails.

Optionally, the second invocation parameter may be specifically used for any of the following:
  invoking a user add authorization service operation of the third network function;
  invoking a user delete authorization service operation of the third network function; and
  invoking a create authorization service operation of the third network function.

Optionally, the second invocation parameter may include, but is not limited to, at least one of the following: a user identifier, multicast service information, quality of service capability information, and RAN node information.

Optionally, the second invocation result may include at least one of the following:
  security information, for example, a key or a key-generating material; and
  a multicast group identifier, for example, a TMGI.

Optionally, after the receiving a second invocation result, step 301 may further include: sending the multicast service operation result to the terminal according to the second invocation result.

Optionally, the method further includes: subscribing terminal message notifications from an AMF so that the AMF forwards terminal messages to an MB SF.

Optionally, the method further includes: sending a radio session request message to a RAN node. The radio session request message includes at least one of the following:
  security information, for example, a key or a key-generating material;
  multicast service information, for example, a multicast address Multicast IP or a multicast group identifier TMGI;
  user plane function information, for example, an MBUF identifier, or an IP address, or an IP address and a port, or an IP address, a port, and a multicast service channel identifier, or a multicast service channel identifier (carried when an MBUF sends data);
  a multicast group identifier, for example, a TMGI;
  a multicast tunnel identifier, where the multicast tunnel identifier may be carried when an MBUF sends data to identify a transmission path; and
  information for creating or updating a radio resource.

It is not difficult to understand that with the solution disclosed in this embodiment, multicast services are able to operate on a network using a service-based architecture that is based on network functions.

Figure 4:
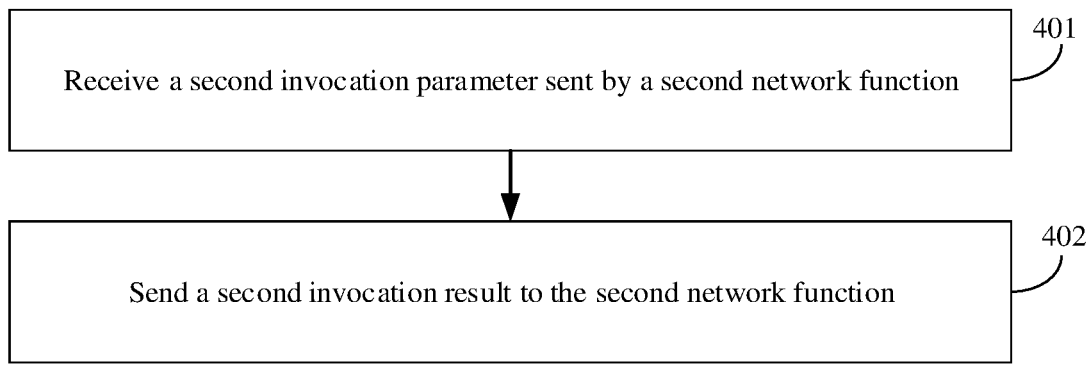
FIG. 4 is a third flowchart of a method for multicast service session operation according to an embodiment of the present invention.

Referring to FIG. 4, FIG. 4 is a flowchart of another method for multicast service session operation according to an embodiment of the present invention. The method is applied to a third network function of a communications device. The third network function is optionally an MBPCF. As shown in FIG. 4, the method may include the following steps.

Step 401: Receive a second invocation parameter sent by a second network function.

In this embodiment, the second invocation parameter is used for invoking an authorization service operation of the third network function. The second invocation parameter includes multicast service information. The second network function may be an MBSF, a network function integrating an MBSF and an AMF, a network function integrating an MBSF and an SMF, or the like.

Optionally, the second invocation parameter may be specifically used for any of the following:
  invoking a user add authorization service operation of the third network function;
  invoking a user delete authorization service operation of the third network function; and
  invoking a create authorization service operation of the third network function.

Step 402: Send a second invocation result to the second network function.

It should be noted that the second invocation result can be understood as an authorization result, indicating that authorization succeeds or authorization fails. For the content included in the second invocation parameter and the second invocation result in this embodiment, reference may be made to the embodiment in FIG. 3, and details are not described herein again.

Optionally, step 402 may include any one of the following:
  (1) determining the second invocation result based on a user identifier and the multicast service information that are included in the second invocation parameter, and sending the second invocation result to the second network function;
  (2) determining the second invocation result based on quality of service capability information supported by a terminal and included in the second invocation parameter, and sending the second invocation result to the second network function;
  for example, if a bandwidth required by a multicast service is greater than a bandwidth indicated in the quality of service capability information of the terminal, a second invocation result indicating that authorization fails is determined; or if a delay required by a multicast service is less than a delay indicated in the quality of service capability information of the terminal, a second invocation result indicating that authorization succeeds is determined; and
  (3) sending a decision request message to a fourth network function, receiving a decision result returned by the fourth network function based on the decision request message, and sending the second invocation result to the second network function based on the decision result;

for example, if the received decision result indicates an error, or indicates an error cause, or the like, a second invocation result indicating that authorization fails is determined.

Optionally, before step 401, the method may further include: receiving configuration information sent by the fourth network function. The configuration information includes event operation information. The event operation information may include any one of the following: an event type; and an event type and a manner of notifying a content provider of event occurrence.

It should be noted that the fourth network function may be other network functions (for example, a unified data management UDM function or a network open function NEF) or network elements (for example, a content provider) other than the first network function, second network function, and third network function.

It is not difficult to understand that with the solution disclosed in this embodiment, multicast services are able to operate on a network using a service-based architecture that is based on network functions.

The following describes this embodiment of the present invention in detail with reference to specific application scenarios.

Application Scenario 1

Figure 5:
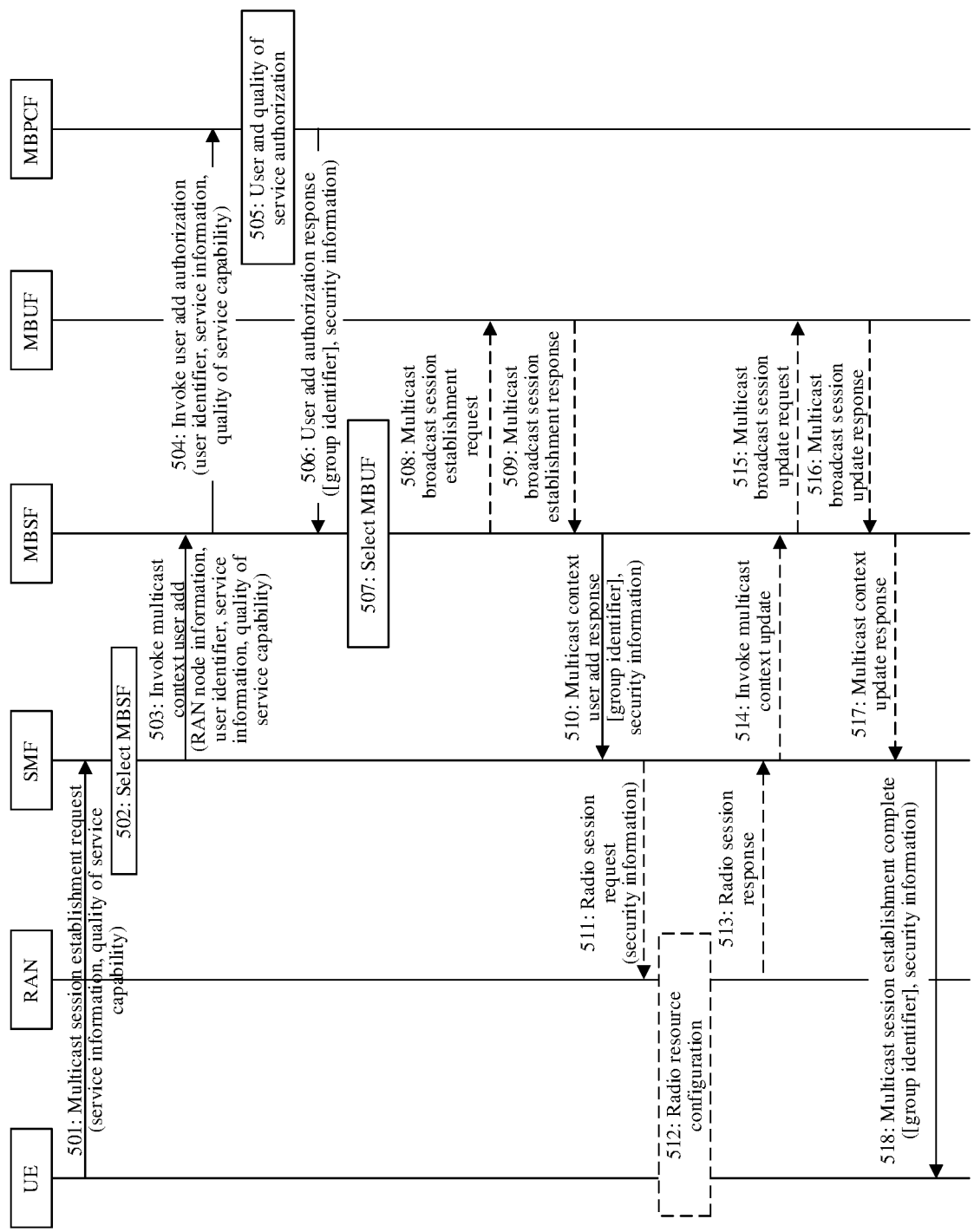
FIG. 5 is a flowchart of a multicast service session operation procedure in Application Scenario 1 according to an embodiment of the present invention.

Application Scenario 1 of the embodiments of the present invention mainly describes a control plane based procedure of a user joining a multicast service group. As shown in FIG. 5, a corresponding session operation procedure may include the following steps.

Step 501: UE sends a multicast session establishment request via a RAN and an AMF, for example, sending an MB Session Establishment Request message.

Optionally, the multicast session establishment request message includes multicast service information, for example, a multicast address Multicast IP or a multicast group identifier (TMGI); or includes indication information for indicating establishment of a multicast session. The multicast session establishment request message may also include quality of service capability information about UE's support of multicast broadcast service, for example, a supported maximum data reception rate and a supported minimum packet loss rate.

Step 502: An SMF receives the multicast session establishment request message forwarded by the AMF, and selects an MB SF.

For example, the SMF may select a nearest MBSF based on location information of a user, or select an appropriate MBSF according to user subscription information.

Step 503: The SMF sends a first invocation parameter to the selected MBSF to invoke a multicast context user add service operation of the MBSF, for example, to invoke an Nmbsf_MBContext_UserAdd service operation (which is a network application programming interface (API)).

Optionally, the first invocation parameter includes a user identifier, received multicast service information, and quality of service capability information. The first invocation parameter may also include information about a RAN node serving the UE, for example, an IP address, or an IP address and a port, or an IP address, a port, and a tunnel identifier (the tunnel identifier is carried when an MBUF sends data); and may also include an operation type indication, for example, user add operation, where the indication may alternatively be given by a corresponding service operation.

Step 504: The MBSF sends a second invocation parameter to the MBPCF to invoke a user add authorization service operation of the MBPCF, for example, invoking an Nmbpcf_PolicyAuthorization_UserAdd service operation. Optionally, the second invocation parameter includes a user identifier, multicast service information, and quality of service capability information that are received.

Step 505: The MBPCF determines that a user corresponding to the user identifier is allowed to receive a specified multicast service (if the multicast service information includes, for example, a multicast address or a multicast group identifier); or the MBPCF determines that the user has a multicast service (if the multicast service information is indication information).

It should be noted that before step 505, the MBPCF may receive configuration information sent by another network function or network element. The configuration information may include event operation information, where the event operation information includes an event type, for example, user authorization event; and may also include a manner of notifying a content provider of event occurrence, for example, by a uniform resource identifier (URI), unified resource locator (URL) information, or a message address (for example, an IP address, or an IP address and a port). The notification manner may correspond to an event type or may be meant for all event types (notification content needs to carry an event type), and default information is used when no notification manner is present. When there is a user authorization event configuration, the MBPCF may request user authorization verification from another network function or network element, with event type information carried, for example, user add or user delete. The MBPCF does not make local determination.

Step 506: The MBPCF returns an authorization result (second invocation result) to the MBSF. If authorization succeeds, the returned result may carry security information and/or a multicast group identifier TMGI.

Step 507: The MBSF selects an MBUF. For example, the MBSF may select an MBUF that is closer to a location of the user, and the selected MBUF may be already in a multicast path tree (for example, used to forward data to other users).

Step 508: If no forwarding path exists between a RAN node and the selected MBUF, the MBSF sends a multicast broadcast session establishment request to the MBUF, for example, sending an MB Session Setup Request message.

Step 509: The MBUF reserves a resource, associates session paths (that is, association between reception and forwarding with a one-to-many relationship, meaning that one received data packet needs to be copied and forwarded in multiple copies), and sends a multicast broadcast session establishment response to the MBSF, for example, sending an MB Session Setup Response message.

Step 510: The MBSF returns to the SMF a first invocation result, which is a result of invoking the multicast context user add service operation.

Optionally, the first invocation result may include security information, for example, a key or a key-generating material. The first invocation result may also include a multicast group identifier, for example, a TMGI. If a radio resource needs to be created or updated, the first invocation result also includes information for notifying the RAN to create or update the radio resource, where the information includes user plane information and may also include multicast service information. The user plane information may be, for example, an MBUF identifier, or an IP address, or an IP address and a port, or an IP address, a port, and a multicast service channel identifier, or a multicast service channel identifier (carried when the MBUF sends data). If the UE needs to be notified, the first invocation result also includes information for notifying the UE of a multicast session establishment response.

Step 511: If the SMF receives the information for creating or updating a radio resource, the SMF sends a radio session request to the RAN node via the AMF, for example, sending an N2 Session Request message, where the message includes the received information for creating or updating a radio resource; or if the SMF receives the information to be notified to the UE, the SMF sends a multicast session establishment response to the UE via the AMF, for example, sending an MB Session Establishment Response message.

Step 512: Optionally, the RAN node configures a radio resource based on the information for creating or updating a radio resource. Optionally, in response to the multicast session establishment response message, the UE sends a multicast session establishment acknowledgment to the AMF via the RAN node, for example, sending an MB Session Establishment Ack message.

Step 513: The RAN node returns a radio session response to the AMF, for example, returning an N2 Session Response message. The message may include information about the RAN node. If the RAN node receives the multicast session establishment acknowledgment message from the UE, the RAN node also forwards the message to the AMF.

Step 514: If the AMF receives a radio session response message returned by the RAN node or the multicast session establishment acknowledgment message sent by the UE, the AMF notifies the SMF that the radio session response message or the multicast session establishment acknowledgment message is received, where the message may include the information about the RAN node. The SMF invokes a multicast context update service operation of the MBSF, for example, invoking an Nmbsf_MBContext_Update service operation.

Step 515: If steps 513 and 514 are executed, the MBSF sends a multicast broadcast session update request to the MBUF, for example, sending an MB Session Update Request message. The message may include the information about the RAN node.

Step 516: The MBUF updates the reserved resource and the association relationship, and sends a multicast broadcast session update response to the MBSF, for example, sending an MB Session Update Response message.

Step 517: The MBSF returns to the SMF a result of invoking a multicast context update service operation. Optionally, the result may include new security information, for example, a key or a key-generating material, may also include a new multicast group identifier TMGI, and may also include multicast session establishment complete information to be notified to the UE.

Step 518: The SMF sends a multicast session establishment complete message to the UE via the AMF, for example, sending an MB Session Establishment Complete message, where the message may include a TMGI or security information.

If steps 511 to 517 are not executed, step 510 may also include multicast session establishment complete information to be notified to the UE, and step 518 is executed after step 510.

In this way, establishment of a data forwarding channel between the MBUF and the RAN node serving the UE is completed, and reservation of a radio broadcast resource of the RAN node is also completed. The content provider can broadcast to multiple UEs joining the multicast group, by sending only one piece of data to the MBUF. The UEs joining the multicast group can use the security information (if received) to process the received radio broadcast data.

In addition, in another embodiment of Application Scenario 1, the MBSF may be selected by the AMF, and the AMF directly interacts with the MBSF without intervention of the SMF. Other interaction processes are the same as those in the foregoing embodiment, and therefore are not further described herein.

Application Scenario 2

Figure 6:
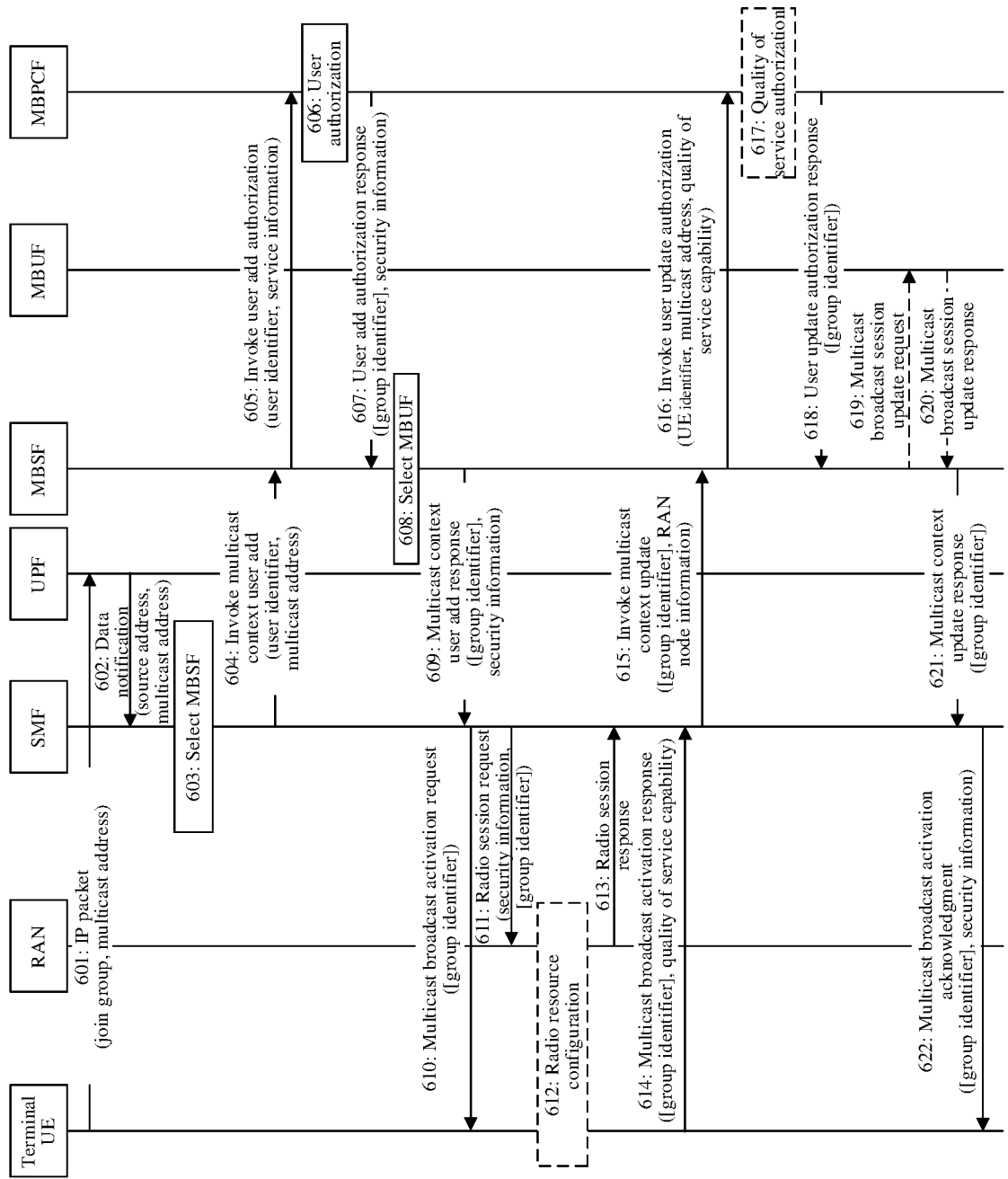
FIG. 6 is a flowchart of a multicast service session operation procedure in Application Scenario 2 according to an embodiment of the present invention.

Application Scenario 2 of the embodiments of the present invention mainly describes a user plane based procedure of a user joining a multicast service group. As shown in FIG. 6, a corresponding session operation procedure may include the following steps.

Step 601: UE sends an IP data packet via a RAN and a user plane of a core network. The IP packet takes a format defined by a multicast group protocol, for example, Internet Group Management Protocol (IGMP) or Multicast Listening Discovery Protocol (MLD). A destination of the IP data packet is, for example, a multicast service address, for example, Multicast IP. The IP data packet is to request to join a corresponding multicast group.

Step 602: After receiving the IP data packet, the UPF sends intercepted packet information to the SMF, for example, having the intercepted packet information carried in a data notification message, so as to request to add to the UE to the multicast group.

Step 603: The SMF selects an MBSF. For example, the SMF may select a nearest MBSF based on location information of a user, or select an appropriate MBSF according to user subscription information.

Step 604: The SMF sends a first invocation parameter to the selected MBSF to invoke a multicast context user add service operation of the MBSF, for example, to invoke an Nmbsf_MBContext_UserAdd service operation (which is a network API).

Optionally, the first invocation parameter includes a user identifier and a received multicast service address. The first invocation parameter may include information about a RAN node serving the UE (for example, an IP address, or an IP address and a port); and may also include an operation type indication, for example, user add operation, where the indication may alternatively be given by a corresponding service operation.

Step 605: The MBSF sends a second invocation parameter to the MBPCF to invoke a user add authorization service operation of the MBPCF, for example, to invoke an Nmbpcf_PolicyAuthorization_UserAdd service operation. Optionally, the second invocation parameter includes a user identifier, multicast service information (for example, a Multicast IP, or a group identifier TMGI mapped based on a Multicast IP, or indication information mapped by determining, based on a Multicast IP, that the user already has this multicast service), and information about a RAN node that are received.

Step 606: The MBPCF determines that a user corresponding to the user identifier is allowed to receive a specified multicast service (if the multicast service information includes, for example, a multicast address or a multicast group identifier); or the MBPCF determines that the user has a multicast service (if the multicast service information is indication information).

It should be noted that before step 606, the MBPCF may receive configuration information sent by another network function or network element. The configuration information may include event operation information, where the event operation information includes an event type, for example, user authorization event; and may also include a manner of notifying a content provider of event occurrence, for example, by a URI, URL information, or a message address (for example, an IP address, or an IP address and a port). The notification manner may correspond to an event type or may be meant for all event types (notification content needs to carry an event type), and default information is used when no notification manner is present. When there is a user authorization event configuration, the MBPCF may request user authorization verification from another network function (for example, a UDM or an NEF) or network element (for example, a content provider), with event type information carried, for example, user add or user delete. The MBPCF does not make local determination.

Step 607: The MBPCF returns an authorization result (second invocation result) to the MBSF. If authorization succeeds, the returned result may carry security information.

Step 608: The MBSF selects an MBUF. For example, the MB SF may select an MBUF that is closer to a location of the user, and the selected MBUF may be already in a multicast path tree (for example, used to forward data to other users).

Step 609: The MBSF returns to the SMF a first invocation result, which is a result of invoking the multicast context user add service operation.

Optionally, the first invocation result may include security information, for example, a key or a key-generating material. The first invocation result may also include a multicast group identifier, for example, a TMGI. If a radio resource needs to be created or updated, the first invocation result also includes information for notifying the RAN to create or update the radio resource, where the information includes user plane information and may also include multicast service information. The user plane information may be, for example, an MBUF identifier, or an IP address, or an IP address and a port, or an IP address, a port, and a multicast service channel identifier, or a multicast service channel identifier (carried when the MBUF sends data). The first invocation result may also include information for notifying the UE of multicast service activation.

Step 610: The SMF sends a multicast broadcast activation request to the UE via the AMF, for example, sending an N1 MBS Activation Request message. The message may include a group identifier, for example, a TMGI.

Step 611: The SMF sends a radio session request to the RAN node via the AMF, for example, sending an N2 Session Request message, where the message includes the received information for creating or updating a radio resource; and the message may also include security information and/or a group identifier.

Optionally, the messages in steps 610 and 611 may be bound in one message and sent to the RAN node.

Step 612: The RAN node configures a radio resource based on the information for creating or updating a radio resource.

Step 613: The RAN node returns a radio session response to the SMF via the AMF, for example, returning an N2 Session Response message.

Optionally, the RAN node may determine, based on information about the MBUF, whether a channel to the MBUF needs to be created for the multicast service indicated by the multicast service information. If such channel needs to be created, a new channel identifier, for example, a tunnel identifier (carried when the MBUF sends data), is assigned; and if a service forwarding channel indicated by the multicast service information already exists, the existing channel identifier is returned. The RAN node may alternatively directly return a channel identifier, or the RAN node may return address information, for example, an IP address or an IP address and a port.

Step 614: The UE sends a multicast broadcast activation response to the SMF via the AMF, for example, sending an N1 MBS Activation Response message. The message may include a group identifier, for example, a TMGI; and may also include quality of service capability information about UE's support of multicast broadcast service, for example, a supported maximum data reception rate and a supported minimum packet loss rate.

Optionally, the messages in steps 613 and 614 may be bound in one message and sent to the AMF.

Step 615: After step 614, the SMF sends the invocation parameter to the MBSF to invoke a multicast context update service operation of the MBSF, for example, to invoke an Nmbsf_MBContext_Update service operation. The invocation parameter may include a TMGI.

Step 616: If the quality of service capability information is received, the MBSF may send an invocation parameter to the MBPCF to invoke an authorization update service operation of the MBPCF. The invocation parameter may include the quality of service capability information, UE identifier, and multicast service information that are received.

Step 617: The MBPCF determines that the terminal with such quality of service capability is capable of receiving multicast services.

Step 618: The MBPCF returns an authorization update invocation result to the MBSF.

Step 619: The MBSF sends a multicast broadcast session update request to the MBUF, for example, sending an MB Session Update Request message. The message includes the information about the RAN node.

Step 620: The MBUF updates a reserved resource and an association relationship, and sends a multicast broadcast session update response to the MBSF, for example, sending an MB Session Update Response message.

Step 621: The MBSF returns to the SMF a result of invoking a multicast context update service operation. Optionally, the result may include a new multicast group identifier TMGI, and may also include information for notifying the UE of multicast broadcast activation acknowledgment.

Step 622: The SMF sends a multicast broadcast activation acknowledgment to the UE via the AMF, for example, sending an N1 MBS Activation Ack message. The message may include a TMGI.

In this way, establishment of a data forwarding channel between the MBUF and the RAN node serving the UE is completed, and reservation of a radio broadcast resource of the RAN node is also completed. The content provider can broadcast to multiple UEs joining the multicast group, by sending only one piece of data to the MBUF. The UEs joining the multicast group can use the security information (if received) to process the received radio broadcast data.

Application Scenario 3

Figure 7:
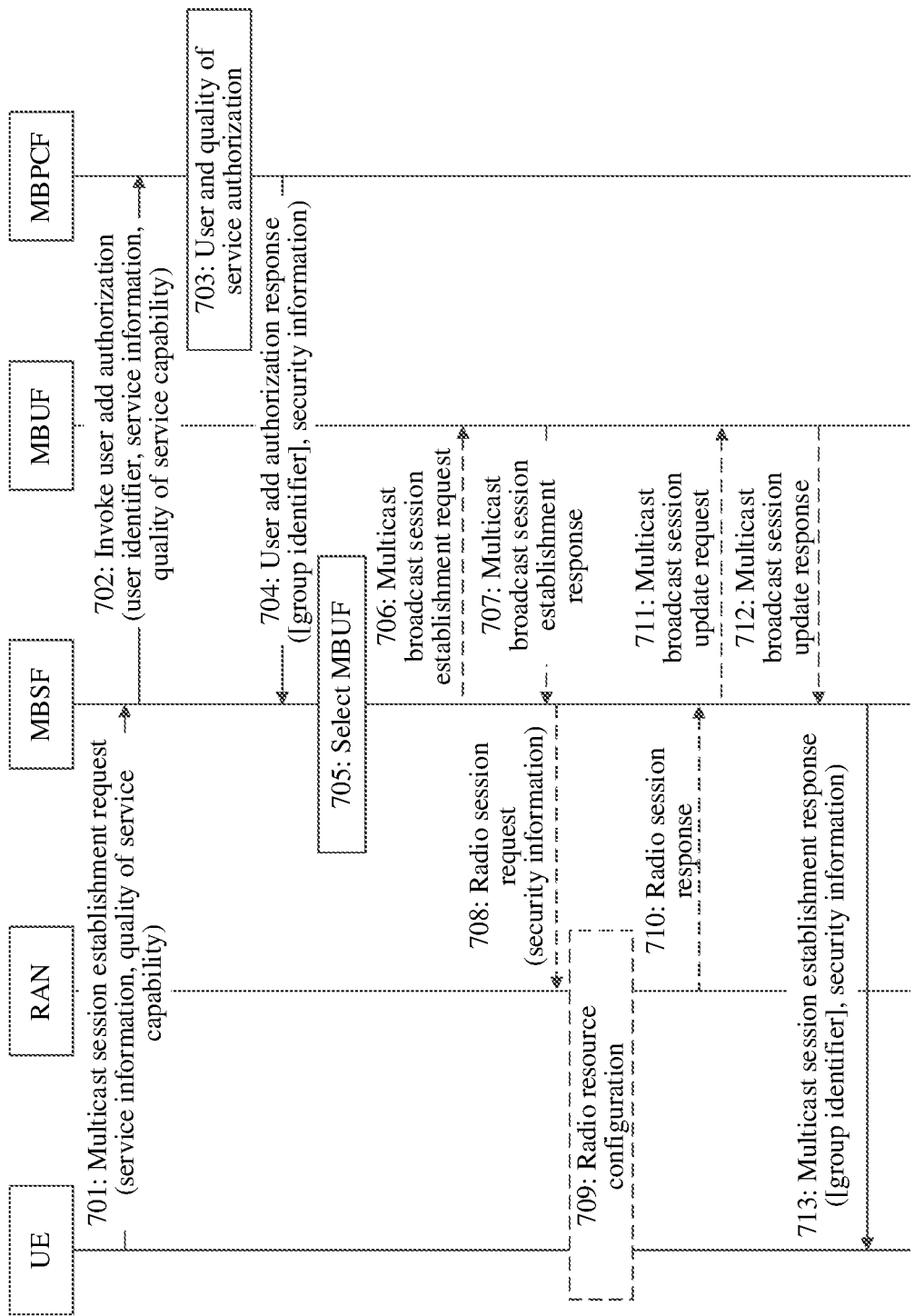
FIG. 7 is a flowchart of a multicast service session operation procedure in Application Scenario 3 according to an embodiment of the present invention.

Application Scenario 3 of the embodiments of the present invention mainly describes a control plane based procedure of a user joining a multicast service group. In this embodiment, the SMF and the MBSF are an integrated function. As shown in FIG. 7, a corresponding session operation procedure may include the following steps.

Step 701: UE sends a multicast session establishment request via a RAN and an AMF, for example, sending an MB Session Establishment Request message.

Optionally, the multicast session establishment request message includes multicast service information, for example, a multicast address Multicast IP or a multicast group identifier TMGI; or includes indication information for indicating establishment of a multicast session. The multicast session establishment request message may also include quality of service capability information about UE's support of multicast broadcast service, for example, a supported maximum data reception rate and a supported minimum packet loss rate.

Step 702: The MBSF receives the multicast session establishment request message forwarded by the AMF, and sends a second invocation parameter to the MBPCF to invoke a create authorization service operation of the MBPCF, for example, to invoke an Nmbpcf_PolicyAuthorization_Create service operation. The second invocation parameter includes a user identifier, multicast service related information, and received quality of service capability information.

Step 703: The MBPCF determines that a user corresponding to the user identifier is allowed to receive a specified multicast service (if the multicast service information includes, for example, a multicast address or a multicast group identifier); or the MBPCF determines that the user has a multicast service (if the multicast service information is indication information).

It should be noted that before step 703, the MBPCF may receive configuration information sent by another network function or network element. The configuration information may include event operation information, where the event operation information includes an event type, for example, user authorization event; and may also include a manner of notifying a content provider of event occurrence, for example, by a URI, URL information, or a message address (for example, an IP address, or an IP address and a port). The notification manner may correspond to an event type or may be meant for all event types (notification content needs to carry an event type), and default information is used when no notification manner is present. When there is a user authorization event configuration, the MBPCF may request user authorization verification from another network function or network element, with event type information carried, for example, user add or user delete. The MBPCF does not make local determination.

Step 704: The MBPCF returns an authorization result (second invocation result) to the MBSF. If authorization succeeds, the returned result may carry security information and/or a multicast group identifier TMGI.

Step 705: The MBSF selects an MBUF. For example, the MBSF may select an MBUF that is closer to a location of the user, and the selected MBUF may be already in a multicast path tree (for example, used to forward data to other users).

Step 706: If no forwarding path exists between a RAN node and the selected MBUF, the MBSF sends a multicast broadcast session establishment request to the MBUF, for example, sending an MB Session Setup Request message.

Step 707: The MBUF reserves a resource, associates session paths (that is, association between reception and forwarding with a one-to-many relationship, meaning that one received data packet needs to be copied and forwarded in multiple copies), and sends a multicast broadcast session establishment response to the MBSF, for example, sending an MB Session Setup Response message.

Step 708: If a forwarding channel between the MBUF and the RAN node needs to be established, the MBSF sends a radio session request to the RAN node via the AMF, for example, sending an N2 Session Request message.

Optionally, the message may include information for creating or updating a radio resource. The message may also include security information, for example, a key or a key-generating material. The message may also include a multicast group identifier TMGI. The message may also include user plane information and/or multicast service information. The user plane information may be, for example, an MBUF identifier, or an IP address, or an IP address and a port, or an IP address, a port, and a multicast service channel identifier, or a multicast service channel identifier (carried when the MBUF sends data). If the UE needs to be notified, the MBSF may further send a multicast session establishment response to the UE via the AMF, for example, sending an MB Session Establishment Response message.

It should be noted that the messages sent to the RAN node and the UE may be sent to the AMF together, and forwarded together to the RAN node by the AMF, and then forwarded to the UE by the RAN node.

Step 709: Optionally, the RAN node configures a radio resource based on the information for creating or updating a radio resource. Optionally, in response to the multicast session establishment response message, the UE sends a multicast session establishment acknowledgment to the AMF via the RAN node, for example, sending an MB Session Establishment Ack message.

Step 710: The RAN node returns a radio session response to the AMF, for example, returning an N2 Session Response message. The message may include information about the RAN node. If the RAN node receives the multicast session establishment acknowledgment message from the UE, the RAN node also forwards the message to the AMF. If the AMF receives the radio session response returned by the RAN node or the multicast session establishment acknowledgment sent by the UE, the AMF notifies the MBSF that the radio session response or the multicast session establishment acknowledgment is received, where the message may carry the information about the RAN node.

Step 711: If step 710 is executed, the MBSF sends a multicast broadcast session update request to the MBUF, for example, sending an MB Session Update Request message. The message may include the information about the RAN node.

Step 712: The MBUF updates the reserved resource and the association relationship, and sends a multicast broadcast session update response to the MBSF, for example, sending an MB Session Update Response message.

Step 713: The MBSF sends a multicast session establishment complete message to the UE, for example, sending an MB Session Establishment Complete message. The message may include new security information, for example, a key or a key-generating material, and may also include a new multicast group identifier TMGI.

Optionally, if steps 708 to 712 are not executed, step 713 may be executed after step 705 or step 707.

In this way, establishment of a data forwarding channel between the MBUF and the RAN node serving the UE is completed, and reservation of a radio broadcast resource of the RAN node is also completed. The content provider can broadcast to multiple UEs joining the multicast group, by sending only one piece of data to the MBUF. The UEs joining the multicast group can use the security information (if received) to process the received radio broadcast data.

In addition, in another embodiment of Application Scenario 3, the AMF and the MBSF may be integrated. In this case, the interaction between the UE and the MBSF and the interaction between the RAN node and the MBSF do not need to be processed by the AMF.

Application Scenario 4

Figure 8:
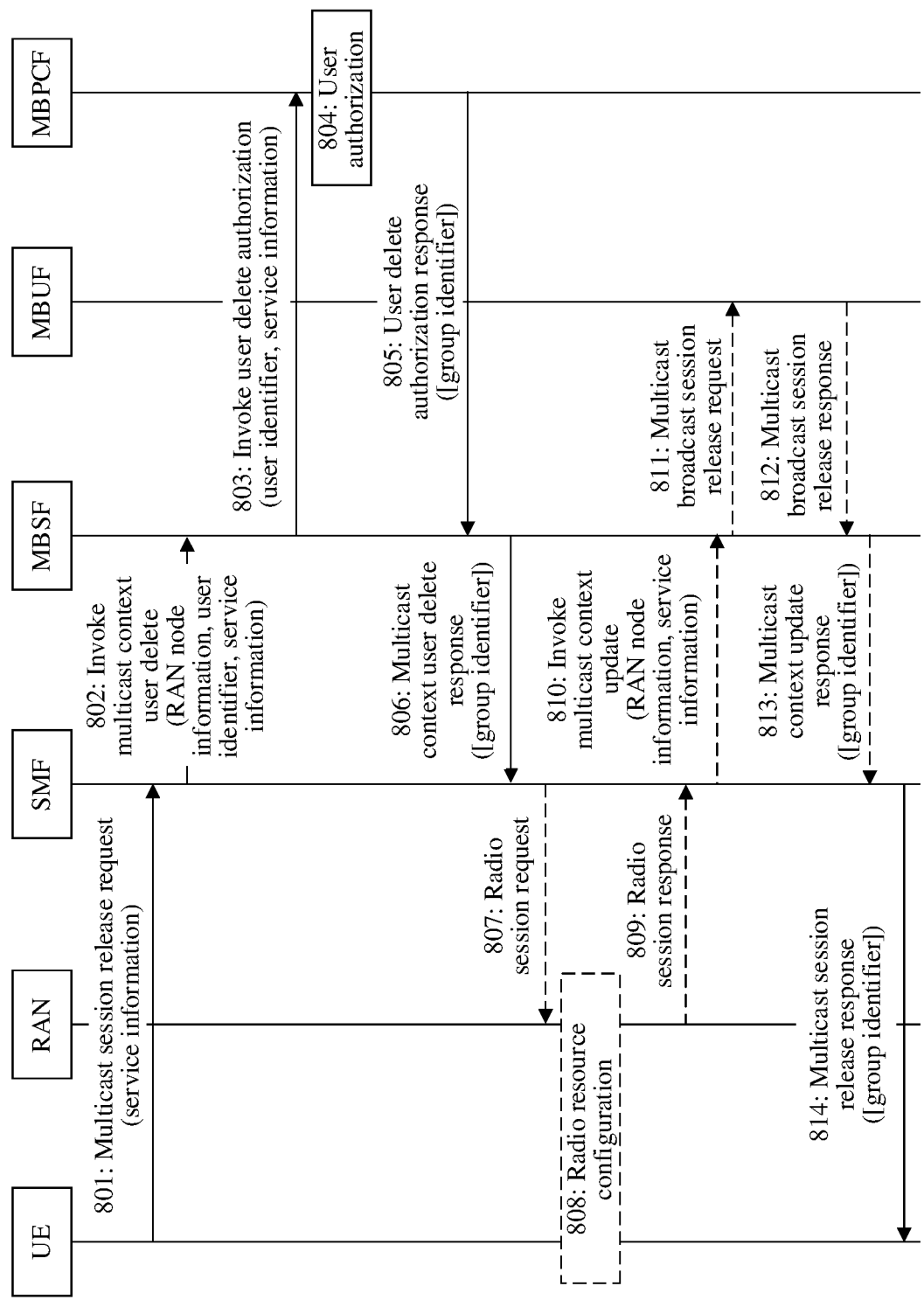
FIG. 8 is a flowchart of a multicast service session operation procedure in Application Scenario 4 according to an embodiment of the present invention.

Application Scenario 4 of the embodiments of the present invention mainly describes a control plane based procedure of a user leaving a multicast service group. As shown in FIG. 8, a corresponding session operation procedure may include the following steps.

Step 801: UE sends a multicast session release request via a RAN and an AMF, for example, sending an MB Session Release Request message.

Optionally, the multicast session release request message includes multicast service information, for example, a multicast address Multicast IP or a multicast group identifier TMGI; or includes indication information for indicating leave from a multicast session. The multicast session release request message may also include quality of service capability information about UE's support of multicast broadcast service, for example, a supported maximum data reception rate and a supported minimum packet loss rate.

Step 802: The SMF sends a first invocation parameter to the MBSF to invoke a multicast context user delete service operation of the MBSF, for example, to invoke an Nmbsf_MBContext_UserDelete service operation (which is a network API).

Optionally, the first invocation parameter includes a user identifier and received multicast service information. The first invocation parameter may also include information about a RAN node serving the UE, for example, an IP address, or an IP address and a port, or an IP address, a port, and a multicast tunnel identifier (which may be carried when an MBUF sends data); and may also include an operation type indication, for example, user delete operation, where the indication may alternatively be given by a corresponding service operation.

Step 803: The MBSF sends a second invocation parameter to the MBPCF to invoke a user delete authorization service operation of the MBPCF, for example, to invoke an Nmbpcf_PolicyAuthorization_UserDelete service operation. The second invocation parameter includes a user identifier and multicast service information that are received.

Step 804: The MBPCF determines that a user corresponding to the user identifier is allowed to receive a specified multicast service (if the multicast service information includes, for example, a multicast address or a multicast group identifier); or the MBPCF determines that the user has a multicast service (if the multicast service information is indication information).

It should be noted that before step 804, the MBPCF may receive configuration information sent by another network function or network element. The configuration information may include event operation information, where the event operation information includes an event type, for example, user authorization event; and may also include a manner of notifying a content provider of event occurrence, for example, by a URI, URL information, or a message address (for example, an IP address, or an IP address and a port). The notification manner may correspond to an event type or may be meant for all event types (notification content needs to carry an event type), and default information is used when no notification manner is present. When there is a user authorization event configuration, the MBPCF may request user authorization verification from another network function or network element, with event type information carried, for example, user add or user delete. The MBPCF does not make local determination. When there is a user release event configuration, the MBPCF may notify other network functions or network elements of leave of the user.

Step 805: The MBPCF returns an authorization result (second invocation result) to the MB SF. If authorization succeeds, the returned result may carry a multicast group identifier TMGI.

Step 806: The MBSF returns to the SMF a first invocation result, which is a result of invoking the multicast context user delete service operation.

Optionally, the first invocation result may also include a multicast group identifier, for example, a TMGI. If a radio resource needs to be updated, the first invocation result also includes information for notifying the RAN to update the radio resource, where the information includes user plane information and multicast service information. The user plane information may be, for example, an MBUF identifier, or an IP address, or an IP address and a port, or an IP address, a port, and a multicast service channel identifier, or a multicast service channel identifier (carried when the MBUF sends data). If the UE needs to be notified, the first invocation result also includes information for notifying the UE of a multicast session release response.

Step 807: If the SMF receives the information for updating a radio resource, the SMF sends a radio session request to the RAN node via the AMF, for example, sending an N2 Session Request message, where the message includes the received information for updating a radio resource; or if the SMF receives the information to be notified to the UE, the SMF sends a multicast session release response to the UE via the AMF, for example, sending an MB Session Release Response message.

Step 808: Optionally, the RAN node configures a radio resource based on the information for updating a radio resource. Optionally, in response to the multicast session release response message, the UE sends a multicast session release acknowledgment to the AMF via the RAN node, for example, sending an MB Session Release Ack message.

Step 809: Optionally, the RAN node returns a radio session response to the AMF, for example, returning an N2 Session Response message. The message may include information about the number of multicast recipients. If the RAN node receives the multicast session release acknowledgment message from the UE, the RAN node also forwards the message to the AMF.

Step 810: If the AMF receives the radio session response message returned by the RAN node or the multicast session release acknowledgment message sent by the UE, the AMF notifies the SMF that the radio session response or the multicast session release acknowledgment is received, where the message may include information about the RAN node. The SMF invokes a multicast context update service operation of the MBSF, for example, invoking an Nmbsf_MBContext_Update service operation.

Step 811: If steps 809 and 810 are executed, the MBSF determines that the RAN node has no users to receive multicast data, and therefore sends a multicast broadcast session release request to the MBUF, for example, sending an MB Session Release Request message, where the message includes the information about the RAN node.

Step 812: The MBUF releases a forwarding resource with the RAN node, and sends a multicast session release response to the MBSF, for example, sending an MB Session Release Response message.

Step 813: Optionally, the MBSF returns to the SMF a result of invoking the multicast context update service operation, where the result may include a multicast group identifier TMGI, and may also include multicast session release complete information to be notified to the UE.

Step 814: The SMF sends a multicast session release complete message to the UE via the AMF, for example, sending an MB Session Release Complete message, where the message may include a TMGI.

If steps 807 to 813 are not executed, step 806 may also include multicast session release complete information to be notified to the UE, and step 814 is executed after step 806.

In addition, in another embodiment of Application Scenario 4, the MBSF may be selected by the AMF, and the AMF directly interacts with the MBSF without intervention of the SMF. Other interaction processes are the same as those in the foregoing embodiment, and therefore are not further described herein.

Application Scenario 5

Figure 9:
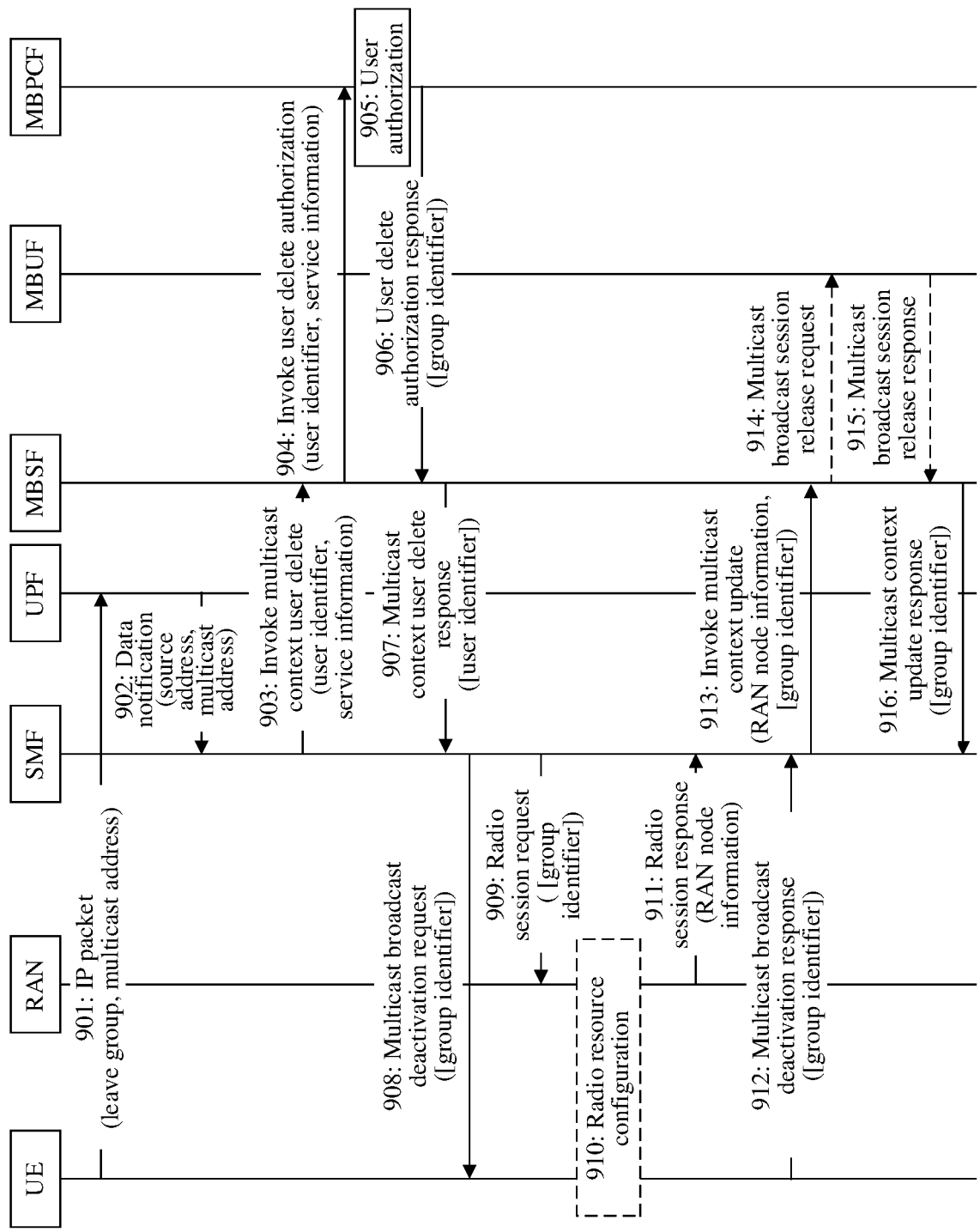
FIG. 9 is a flowchart of a multicast service session operation procedure in Application Scenario 5 according to an embodiment of the present invention.

Application Scenario 5 of the embodiments of the present invention mainly describes a user plane based procedure of a user leaving a multicast service group. As shown in FIG. 9, a corresponding session operation procedure may include the following steps.

Step 901: UE sends an IP data packet via a RAN and a user plane of a core network. The IP packet takes a format defined by a multicast group protocol, for example, IGMP or MLD. A destination of the IP data packet is a multicast service address, for example, Multicast IP. The IP data packet is to request to leave a corresponding multicast group.

Step 902: After receiving the IP data packet, a UPF sends intercepted packet information to an SMF, for example, having the intercepted packet information carried in a Data Notification message, so as to request to delete the UE from the multicast group.

Step 903: The SMF sends a first invocation parameter to a selected MBSF to invoke a multicast context user delete service operation of the MBSF, for example, to invoke an Nmbsf_MBContext_UserDelete service operation (which is a network API).

Optionally, the first invocation parameter includes a user identifier and a received multicast service address. The first invocation parameter may include information about a RAN node serving the UE (for example, an IP address, or an IP address and a port); and may also include an operation type indication, for example, user release operation, where the indication may alternatively be given by a corresponding service operation.

Step 904: The MBSF sends a second invocation parameter to an MBPCF to invoke a user delete authorization service operation of the MBPCF, for example, to invoke an Nmbpcf_PolicyAuthorization_UserDelete service operation. Optionally, the second invocation parameter includes the user identifier, multicast service information (for example, a Multicast IP, or a group identifier TMGI mapped based on a Multicast IP, or indication information mapped by determining, based on a Multicast IP, that the user already has this multicast service), and information about the RAN node that are received.

Step 905: The MBPCF determines that a user corresponding to the user identifier is allowed to receive a specified multicast service (if the multicast service information includes, for example, a multicast address or a multicast group identifier); or the MBPCF determines that the user has a multicast service (if the multicast service information is indication information).

It should be noted that before step 905, the MBPCF may receive configuration information sent by another network function or network element. The configuration information may include event operation information, where the event operation information includes an event type, for example, user authorization event; and may also include a manner of notifying a content provider of event occurrence, for example, by a URI, URL information, or a message address (for example, an IP address, or an IP address and a port). The notification manner may correspond to an event type or may be meant for all event types (notification content needs to carry an event type), and default information is used when no notification manner is present. When there is a user authorization event configuration, the MBPCF may request user authorization verification from another network function (for example, a UDM or an NEF) or network element (for example, a content provider), with event type information carried, for example, user add or user delete. The MBPCF does not make local determination.

Step 906: The MBPCF returns an authorization result (second invocation result) to the MB SF. If authorization succeeds, the returned result may carry a multicast group identifier, for example, a TMGI.

Step 907: The MBSF returns to the SMF a first invocation result, which is a result of invoking the multicast context user delete service operation.

Optionally, the first invocation result may include security information, for example, a key or a key-generating material. The first invocation result may also include a multicast group identifier, for example, a TMGI. If a radio resource needs to be updated, the first invocation result also includes information for notifying the RAN to update the radio resource, where the information includes user plane information and multicast service information. The user plane information may be, for example, an MBUF identifier, or an IP address, or an IP address and a port, or an IP address, a port, and a multicast service channel identifier, or a multicast service channel identifier (carried when the MBUF sends data). The first invocation result may also include information for notifying the UE of multicast service deactivation.

Step 908: The SMF sends a multicast broadcast deactivation request to the UE via the AMF, for example, sending an N1 MBS De-activation Request message. The message includes a multicast group identifier, for example, a TMGI.

Step 909: The SMF sends a radio session request to the RAN node via the AMF, for example, sending an N2 Session Request message, where the message includes the received information for updating a radio resource; and the message may also include a multicast group identifier.

Optionally, the messages in steps 908 and 909 may be bound in one message and sent to the RAN node.

Step 910: Optionally, the RAN node configures a radio resource based on the information for updating a radio resource.

Step 911: The RAN node returns a radio session response to the AMF, for example, returning an N2 Session Response message. The message may include information about the RAN node, where the information includes information about the number of multicast recipients.

Step 912: The UE sends a multicast broadcast deactivation response to the SMF via the AMF, for example, sending an N1 MBS De-activation Response message. The message may include a multicast group identifier, for example, a TMGI.

Optionally, the messages in steps 911 and 912 may be bound in one message and sent to the AMF.

Step 913: After step 912, the SMF sends the invocation parameter to the MBSF to invoke a multicast context update service operation of the MBSF, for example, to invoke an Nmbsf_MBContext_Update service operation. The invocation parameter may include the information about the RAN node and a group identifier that are received.

Step 914: The MBSF determines that the RAN node has no users to receive multicast data, and therefore sends a multicast broadcast session release request to the MBUF, for example, sending an MB Session Release Request message. The message may include the information about the RAN node.

Step 915: The MBUF releases a forwarding resource with the RAN node, and sends a multicast broadcast session release response to the MBSF, for example, sending an MB Session Release Response message.

Step 916: Optionally, the MBSF returns to the SMF a result of invoking the multicast context update service operation, where the result may include a multicast group identifier, for example, a TMGI.

Application Scenario 6

Figure 10A:
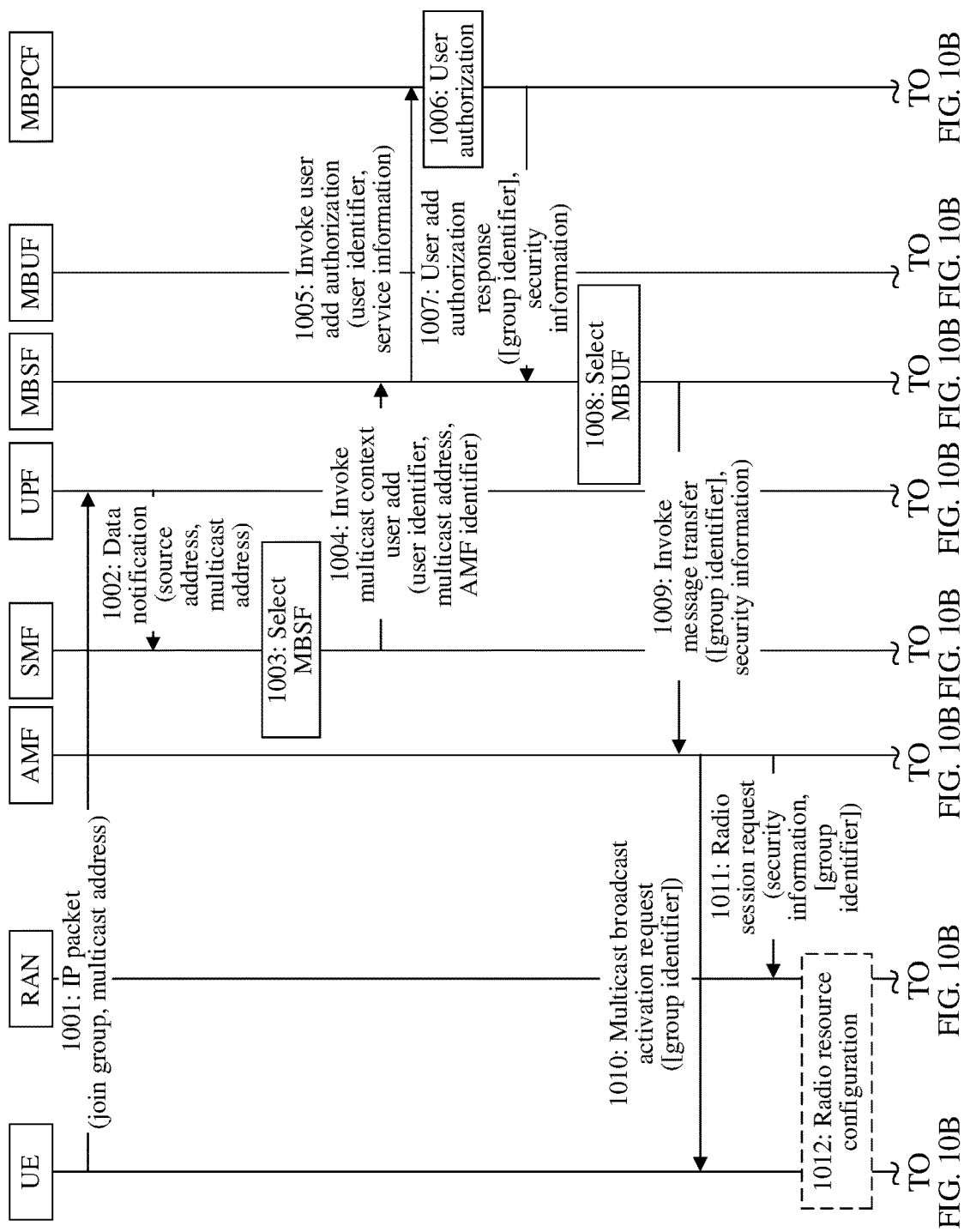
FIG. 10A and FIG. 10B are a flowchart of a multicast service session operation procedure in Application Scenario 6 according to an embodiment of the present invention.
Figure 10B:
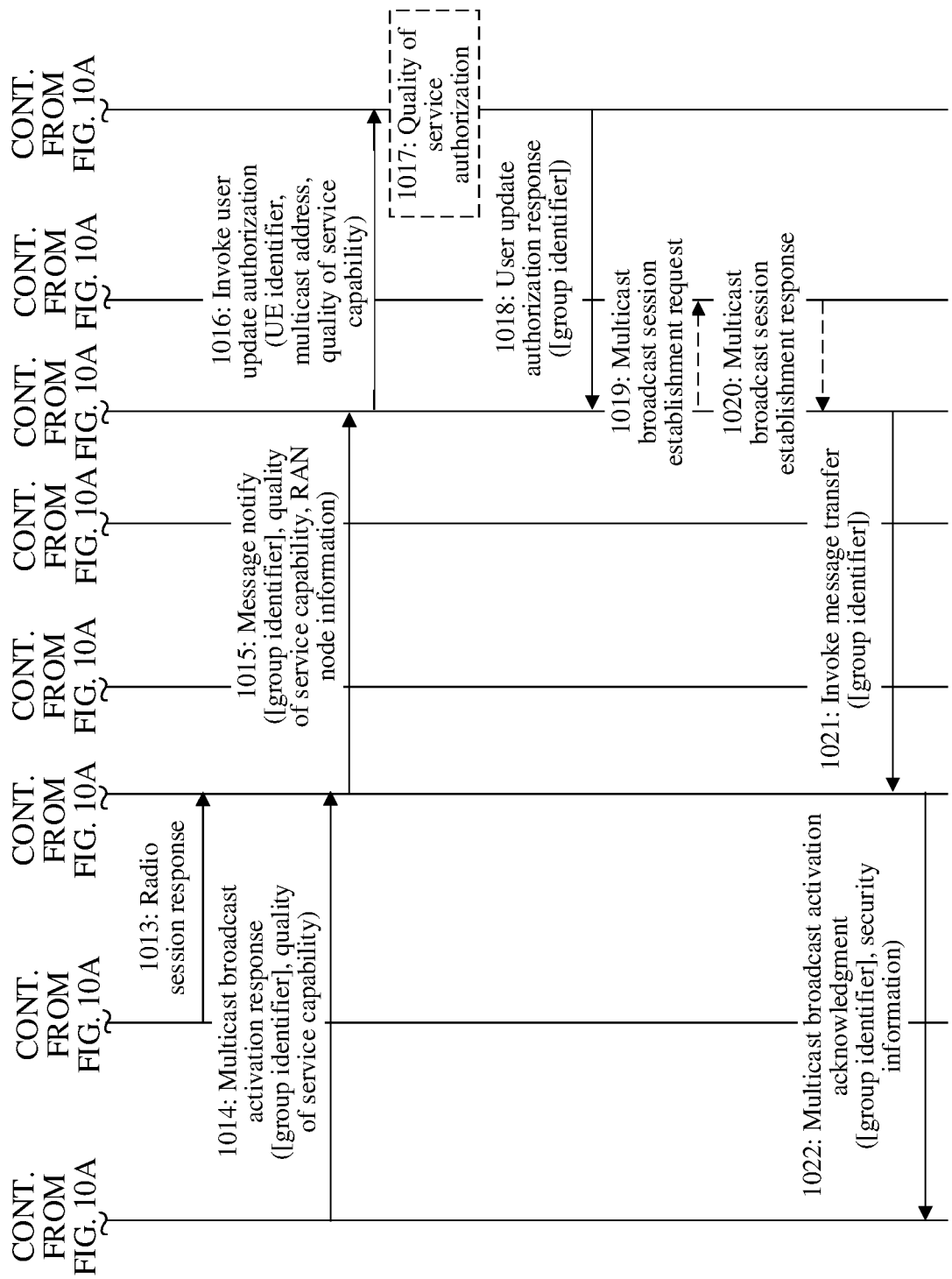

Application Scenario 6 of the embodiments of the present invention mainly describes a user plane based procedure of a user joining a multicast service group. As shown in FIG. 10A and FIG. 10B, a corresponding session operation procedure may include the following steps.

Step 1001: UE sends an IP data packet via a RAN and a user plane of a core network. The IP packet takes a format defined by a multicast group protocol, for example, IGMP or MLD. A destination of the IP data packet is, for example, a multicast service address, for example, Multicast IP. The IP data packet is to request to join a corresponding multicast group.

Step 1002: After receiving the IP data packet, the UPF sends intercepted packet information to the SMF, for example, having the intercepted packet information carried in a Data Notification message, so as to request to add the UE to the multicast group.

Step 1003: The SMF selects an MBSF. For example, the SMF may select a nearest MBSF based on location information of a user, or select an appropriate MBSF according to user subscription information.

Step 1004: The SMF sends a first invocation parameter to the selected MBSF to invoke a multicast context user add service operation of the MBSF, for example, to invoke an Nmbsf_MBContext_UserAdd service operation (which is a network API).

Optionally, the first invocation parameter includes a user identifier, a received multicast service address, and an identifier of the AMF serving the user. The first invocation parameter may also include information about the RAN node serving the terminal (for example, an IP address, or an IP address and a port); and may also include an operation type indication, for example, user add operation, where the indication may alternatively be given by a corresponding service operation.

Step 1005: The MBSF sends a second invocation parameter to the MBPCF to invoke a user add authorization service operation of the MBPCF, for example, to invoke an Nmbpcf_PolicyAuthorization_UserAdd service operation. Optionally, the second invocation parameter includes the user identifier, multicast service information (for example, a Multicast IP, or a group identifier TMGI mapped based on a Multicast IP, or indication information mapped by determining, based on a Multicast IP, that the user already has this multicast service), and information about the RAN node that are received.

Step 1006: The MBPCF determines that a user corresponding to the user identifier is allowed to receive a specified multicast service (if the multicast service information includes, for example, a multicast address or a multicast group identifier); or the MBPCF determines that the user has a multicast service (if the multicast service information is indication information).

It should be noted that before step 1006, the MBPCF may receive configuration information sent by another network function or network element. The configuration information may include event operation information, where the event operation information includes an event type, for example, user authorization event; and may also include a manner of notifying a content provider of event occurrence, for example, by a URI, URL information, or a message address (for example, an IP address, or an IP address and a port). The notification manner may correspond to an event type or may be meant for all event types (notification content needs to carry an event type), and default information is used when no notification manner is present. When there is a user authorization event configuration, the MBPCF may request user authorization verification from another network function (for example, a UDM or an NEF) or network element (for example, a content provider), with event type information carried, for example, user add or user delete. The MBPCF does not make local determination.

Step 1007: The MBPCF returns an authorization result (second invocation result) to the MBSF. If authorization succeeds, the returned result may carry security information.

Step 1008: The MBSF selects an MBUF. For example, the MBSF may select an MBUF that is closer to a location of the user, and the selected MBUF may be already in a multicast path tree (for example, used to forward data to other users).

Step 1009: The MBSF sends an invocation parameter to the AMF to invoke a message transfer service operation of the AMF, for example, to invoke a Namf_Communication_N1N2MessageTransfer service operation. The invocation parameter includes a message addressed to the UE for notifying the UE of multicast service activation. If a radio resource needs to be created or updated, the invocation parameter may also include a message addressed to the RAN, where both the message addressed to the UE and the message addressed to the RAN may include security information, for example, a key or a key-generating material; and may also include a multicast group identifier, for example, a TMGI. The message addressed to the RAN includes information for notifying the RAN to create or update a radio resource, where the information includes user plane information, and may include multicast service information. The user plane information may be, for example, an MBUF identifier, or an IP address, or an IP address and a port, or an IP address, a port, and a multicast service channel identifier, or a multicast service channel identifier (carried when the MBUF sends data).

Step 1010: The AMF sends a multicast broadcast activation request to the UE, for example, sending an N1 MBS Activation Request message. The message may include a group identifier, for example, a TMGI.

Step 1011: The AMF sends a radio session request to the RAN node, for example, sending an N2 Session Request message, where the message includes the received information for creating or updating a radio resource; and the message may also include security information and/or a group identifier.

Optionally, the messages in steps 1010 and 1011 may be bound in one message and sent to the RAN node.

Step 1012: The RAN node configures a radio resource based on the information for creating or updating a radio resource.

Step 1013: The RAN node returns a radio session response to the AMF, for example, returning an N2 Session Response message.

Optionally, the RAN node may determine, based on information about the MBUF, whether a channel to the MBUF needs to be created for the multicast service indicated by the multicast service information. If such channel needs to be created, a new channel identifier, for example, a tunnel identifier (carried when the MBUF sends data), is assigned; and if a service forwarding channel indicated by the multicast service information already exists, the existing channel identifier is returned. The RAN node may alternatively directly return a channel identifier, or the RAN node may return address information, for example, an IP address or an IP address and a port.

Step 1014: The UE sends a multicast broadcast activation response to the AMF, for example, sending an N1 MBS Activation Response message. The message may include a group identifier, for example, a TMGI; and may also include quality of service capability information about UE's support of multicast broadcast service, for example, a supported maximum data reception rate and a supported minimum packet loss rate.

Optionally, the messages in steps 1013 and 1014 may be bound in one message and sent to the AMF.

Step 1015: After step 1014, the AMF invokes its own message notify service operation, for example, invoking a Namf_Communication_N1MessageNotify service operation, where the invocation parameter may include the message received in step 1014, and may also include the information about the RAN node, for example, an IP address or an IP address and a port of the RAN node, and may also include a multicast group identifier, for example, a TMGI.

Before step 1015, the BMSF may invoke a message subscribe service operation of the AMF, for example, invoking a Namf_Communication_N1MessageSubscribe service operation, so that in step 1015, the AMF can invoke the message notify service operation to forward the received message to the MBSF.

Step 1016: If the quality of service capability information is received, the MBSF may send an invocation parameter to the MBPCF to invoke an authorization update service operation of the MBPCF. The invocation parameter may include the quality of service capability information, UE identifier, and multicast service information that are received.

Step 1017: The MBPCF determines that the terminal with such quality of service capability is capable of receiving multicast services.

Step 1018: The MBPCF returns an authorization update invocation result to the MBSF.

Step 1019: The MBSF sends a multicast session update request to the MBUF, for example, sending an MB Session Update Request message. The message includes the information about the RAN node.

Step 1020: The MBUF updates the reserved resource and the association relationship, and sends a multicast session update response to the MBSF, for example, sending an MB Session Update Response message.

Step 1021: The MBSF invokes a message transfer service operation of the AMF, for example, invoking a Namf_Communication_N1N2MessageTransfer service operation, where the invocation parameter includes a message addressed to the UE to notify the UE of multicast broadcast activation acknowledgment, where the message may include a new multicast group identifier TMGI and may also include security information.

Step 1022: The AMF sends a multicast broadcast activation acknowledgment to the UE, for example, sending an N1 MBS Activation Ack message, where the message may include a TMGI or security information.

In this way, establishment of a data forwarding channel between the MBUF and the RAN node serving the UE is completed, and reservation of a radio broadcast resource of the RAN node is also completed. The content provider can broadcast to multiple UEs joining the multicast group, by sending only one piece of data to the MBUF. The UEs joining the multicast group can use the security information (if received) to process the received radio broadcast data.

The foregoing embodiments have described the method for multicast service session operation of the present invention, and the following is to describe a communications device of the present invention with reference to embodiments and the accompanying drawings.

Figure 11:
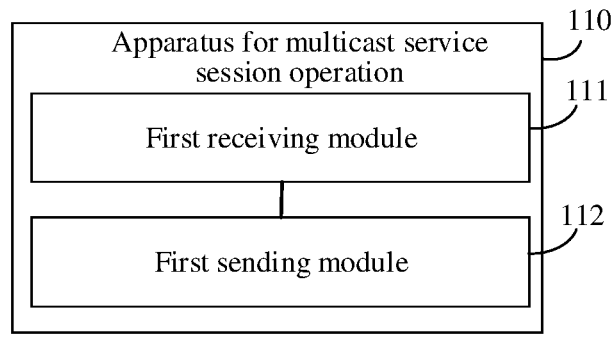
FIG. 11 is a first schematic structural diagram of an apparatus for multicast service session operation according to an embodiment of the present invention.

Referring to FIG. 11, FIG. 11 is a schematic structural diagram of an apparatus for multicast service session operation according to an embodiment of the present invention. The apparatus for multicast service session operation is applied to a first network function of a communications device. The first network function is, for example, an AMF or an SMF. As shown in FIG. 11, the apparatus 110 for multicast service session operation includes:

a first receiving module 111, configured to receive from a terminal a request including multicast service information; and a first sending module 112, configured to send a first invocation parameter to a second network function, where the first invocation parameter is used for invoking a multicast context service operation of the second network function.

Optionally, the apparatus 110 for multicast service session operation may further include:

a second receiving module, configured to receive a first invocation result returned by the second network function; and a second sending module, configured to: send a multicast service operation result to the terminal according to the first invocation result, or refuse to send information to the terminal, according to the first invocation result.

Optionally, the request including multicast service information may include any one of the following:

a multicast session establishment request message;

a first data packet for requesting to join a corresponding multicast group;

a multicast session release request message; and a second data packet for requesting to leave a corresponding multicast group.

Optionally, the multicast service operation result includes any one of the following:

a multicast session establishment success message;

a multicast session establishment failure message;

multicast service activation information;

multicast service deactivation information; and information that leaving a multicast session is allowed.

Optionally, the first invocation parameter is specifically used for any of the following:

invoking a multicast context user add service operation of the second network function; and invoking a multicast context user delete service operation of the second network function.

Optionally, the first invocation parameter includes at least one of the following:

operation type indication information, where the operation type indication information is used to indicate any one of the following: user add, user delete, multicast session establishment, and multicast session release;

multicast service information, where the multicast service information is received from the terminal;

quality of service capability information, where the quality of service capability information is received from the terminal; and information about a radio access network RAN node serving the UE.

Optionally, the multicast service information includes at least one of the following:

a multicast service address;

a multicast group identifier; and a uniform resource locator.

Optionally, the first invocation result includes at least one of the following:

a multicast group identifier;

information for notifying a RAN to create or update a radio resource; and the multicast service operation result.

It can be understood that the apparatus 110 for multicast service session operation in this embodiment can implement the processes implemented in the method embodiment shown in FIG. 2, with the same beneficial effects achieved. To avoid repetition, details are not described herein again.

Figure 12:
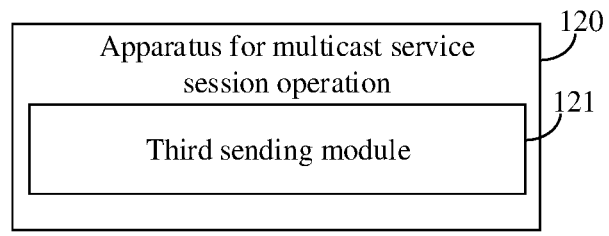
FIG. 12 is a second schematic structural diagram of an apparatus for multicast service session operation according to an embodiment of the present invention.

Referring to FIG. 12, FIG. 12 is a schematic structural diagram of an apparatus for multicast service session operation according to an embodiment of the present invention. The apparatus for multicast service session operation is applied to a second network function of a communications device. The second network function is, for example, an MBSF, a network function integrating an MBSF and an MBPCF, a network function integrating an MBSF and an AMF, or a network function integrating an MBSF and an SMF. As shown in FIG. 12, the apparatus 120 for multicast service session operation includes:

a third sending module 121, configured to send a multicast service operation result to a terminal.

Optionally, the apparatus 120 for multicast service session operation may further include:

a third receiving module, configured to receive from a terminal a request including multicast service information;

or receive a first invocation parameter sent by a first network function, where the first invocation parameter is used for invoking a multicast context service operation of the second network function.

Optionally, the apparatus 120 for multicast service session operation may further include:

a fourth sending module, configured to send a second invocation parameter to a third network function, where the second invocation parameter is used for invoking an authorization service operation of the third network function; and a fourth receiving module, configured to receive a second invocation result sent by the third network function.

Optionally, the third sending module 121 is specifically configured to:

send the multicast service operation result to the terminal via the first network function.

Optionally, the third sending module 121 is specifically configured to:

send the multicast service operation result to the terminal according to the second invocation result.

Optionally, the first invocation parameter is specifically used for any of the following:

invoking a multicast context user add service operation of the second network function; and invoking a multicast context user delete service operation of the second network function.

Optionally, the request including multicast service information includes any one of the following:

a multicast session establishment request message; and a multicast session release request message.

Optionally, the apparatus 120 for multicast service session operation may further include:

a subscription module, configured to subscribe terminal message notifications from an access management function.

Optionally, the apparatus 120 for multicast service session operation may further include:

a fifth sending module, configured to send a radio session request message to a RAN node.

The radio session request message includes at least one of the following: security information;

multicast service information;

user plane function information;

a multicast group identifier;

a multicast tunnel identifier; and information for creating or updating a radio resource.

Optionally, the second invocation parameter is specifically used for any of the following:

invoking a user add authorization service operation of the third network function;

invoking a user delete authorization service operation of the third network function; and invoking a create authorization service operation of the third network function.

Optionally, the second invocation parameter includes at least one of the following:

a user identifier;

multicast service information;

quality of service capability information; and information about a RAN node.

Optionally, the second invocation result includes at least one of the following:

security information; and a multicast group identifier.

It can be understood that the apparatus 120 for multicast service session operation in this embodiment can implement the processes implemented in the method embodiment shown in FIG. 3, with the same beneficial effects achieved. To avoid repetition, details are not described herein again.

Figure 13:
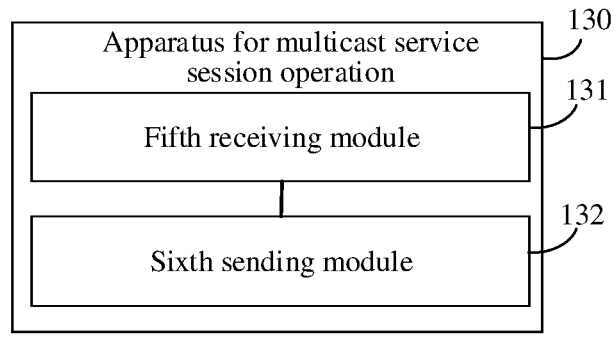
FIG. 13 is a third schematic structural diagram of an apparatus for multicast service session operation according to an embodiment of the present invention.

Referring to FIG. 13, FIG. 13 is a schematic structural diagram of an apparatus for multicast service session operation according to an embodiment of the present invention. The apparatus for multicast service session operation is applied to a third network function of a communications device. The third network function is, for example, an MBPCF. As shown in FIG. 13, the apparatus 130 for multicast service session operation may include:

a fifth receiving module 131, configured to receive a second invocation parameter sent by a second network function, where the second invocation parameter is used for invoking an authorization service operation of the third network function, and the second invocation parameter includes multicast service information; and a sixth sending module 132, configured to send a second invocation result to the second network function.

Optionally, the second invocation parameter is specifically used for any of the following:

invoking a user add authorization service operation of the third network function;

invoking a user delete authorization service operation of the third network function; and invoking a create authorization service operation of the third network function.

Optionally, the sixth sending module 132 is specifically configured to:

determine the second invocation result based on a user identifier and the multicast service information that are included in the second invocation parameter, and send the second invocation result to the second network function; or determine the second invocation result based on quality of service capability information supported by a terminal and included in the second invocation parameter, and send the second invocation result to the second network function; or send a decision request message to a fourth network function, receiving a decision result returned by the fourth network function based on the decision request message, and send the second invocation result to the second network function based on the decision result.

Optionally, the apparatus 130 for multicast service session operation may further include:

a sixth receiving module, configured to receive configuration information sent by the fourth network function, where the configuration information includes event operation information, and the event operation information includes any one of the following:

an event type; and an event type and a manner of notifying a content provider of event occurrence.

It can be understood that the apparatus 130 for multicast service session operation in this embodiment can implement the processes implemented in the method embodiment shown in FIG. 4, with the same beneficial effects achieved. To avoid repetition, details are not described herein again.

Figure 14:
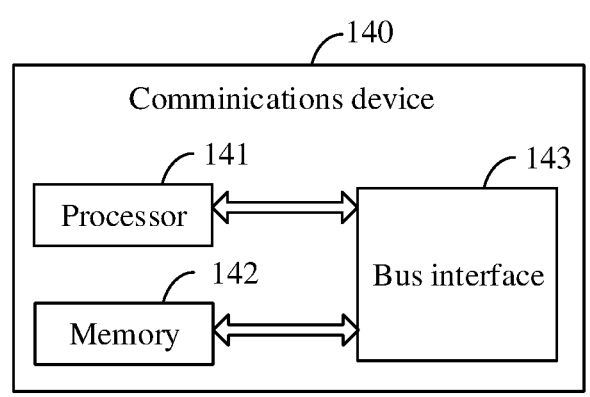
FIG. 14 is a schematic structural diagram of a communications device according to an embodiment of the present invention.

Referring to FIG. 14, FIG. 14 is a schematic structural diagram of a communications device according to an embodiment of the present invention. As shown in FIG. 14, the communications device 140 includes a processor 141, a memory 142, and a computer program stored in the memory 142 and capable of running on the processor. The components of the communications device 140 are coupled together via a bus interface 143, and when the computer program is executed by the processor 141, the processes implemented in the method embodiment shown in FIG. 2 may be implemented, or the processes implemented in the method embodiment shown in FIG. 3 are implemented, or the processes implemented in the method embodiment shown in FIG. 4 are implemented, with the same technical effects achieved. To avoid repetition, details are not described herein again.

An embodiment of the present invention further provides a computer-readable storage medium. A computer program is stored in the computer-readable storage medium, and when the computer program is executed by a processor, the processes implemented in the method embodiment shown in FIG. 2 are implemented, or the processes implemented in the method embodiment shown in FIG. 3 are implemented, or the processes implemented in the method embodiment shown in FIG. 4 are implemented, with the same technical effects achieved. To avoid repetition, details are not described herein again. For example, the computer-readable storage medium is a read-only memory (ROM), a random access memory (RAM), a magnetic disk, or an optical disc.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing embodiments, persons skilled in the art can clearly understand that the method in the foregoing embodiments may be implemented by software in addition to a necessary universal hardware platform or by hardware only. In most cases, the former is a preferred implementation. Based on such an understanding, the technical solutions of the present invention essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

The embodiments of the present invention are described above with reference to the accompanying drawings, but the present invention is not limited to these embodiments. The embodiments are only illustrative rather than restrictive. Inspired by the present invention, a person of ordinary skill in the art can still derive many variations without departing from the essence of the present invention and the protection scope of the claims. All these variations shall fall within the protection of the present invention.

What is claimed is:

1. A method for multicast service session operation, performed by a first network function of a communications device, comprising:

receiving from a terminal a request comprising multicast service information; and sending a first invocation parameter to a second network function, wherein the first invocation parameter is used for invoking a multicast context service operation of the second network function;

wherein the first network function is a session management function (SMF); and the second network function is a multicast broadcast session management (MBSF) or a network function integrating the MBSF and a multicast broadcast policy control function (MBPCF) (MBPCF);

wherein the first invocation parameter comprises:

operation type indication information, wherein the operation type indication information is used to indicate any one of the following: user add, user delete, multicast session establishment, and multicast session release.

2. The method according to claim 1, further comprising:

receiving a first invocation result returned by the second network function; and sending a multicast service operation result to the terminal according to the first invocation result; or
refusing to send information to the terminal, according to the first invocation result.

3. The method according to claim 2, wherein the multicast service operation result comprises any one of the following:
a multicast session establishment success message;
a multicast session establishment failure message;
multicast service activation information;
multicast service deactivation information; and
information that leaving a multicast session is allowed.

4. The method according to claim 2, wherein the first invocation result comprises at least one of the following:
a multicast group identifier;
information for notifying a RAN to create or update a radio resource; and
the multicast service operation result.

5. The method according to claim 1, wherein the request comprising multicast service information comprises any one of the following:
a multicast session establishment request message;
a first data packet for requesting to join a corresponding multicast group;
a multicast session release request message; and
a second data packet for requesting to leave a corresponding multicast group.

6. The method according to claim 1, wherein the first invocation parameter is specifically used for any one of the following:
invoking a multicast context user add service operation of the second network function; and
invoking a multicast context user delete service operation of the second network function.

7. The method according to claim 1, wherein the first invocation parameter further comprises at least one of the following:
multicast service information, wherein the multicast service information is received from the terminal;
quality of service capability information, wherein the quality of service capability information is received from the terminal; and
information about a radio access network RAN node serving the UE,
or
wherein the multicast service information comprises at least one of the following:
a multicast service address;
a multicast group identifier; and
a uniform resource locator.

8. A communications device, applied to a first network function, comprising a memory, a processor, and a program stored in the memory and capable of running on the processor, wherein when the program is executed by the processor, the program causes the processor to implement the steps of the method for multicast service session operation, wherein the method comprises:
receiving from a terminal a request comprising multicast service information; and
sending a first invocation parameter to a second network function, wherein the first invocation parameter is used for invoking a multicast context service operation of the second network function;
wherein the first network function is a session management function (SMF); and
the second network function is a multicast broadcast session management (MBSF) or a network function integrating the MBSF and a multicast broadcast policy control function (MBPCF);
wherein the first invocation parameter comprises:
operation type indication information, wherein the operation type indication information is used to indicate any one of the following: user add, user delete, multicast session establishment, and multicast session release.

9. The communications device according to claim 8, the method further comprising:
receiving a first invocation result returned by the second network function; and
sending a multicast service operation result to the terminal according to the first invocation result; or
refusing to send information to the terminal, according to the first invocation result.

10. The communications device according to claim 9, wherein the multicast service operation result comprises any one of the following:
a multicast session establishment success message;
a multicast session establishment failure message;
multicast service activation information;
multicast service deactivation information; and
information that leaving a multicast session is allowed.

11. The communications device according to claim 9, wherein the first invocation result comprises at least one of the following:
a multicast group identifier;
information for notifying a RAN to create or update a radio resource; and
the multicast service operation result.

12. The communications device according to claim 8, wherein the request comprising multicast service information comprises any one of the following:
a multicast session establishment request message;
a first data packet for requesting to join a corresponding multicast group;
a multicast session release request message; and
a second data packet for requesting to leave a corresponding multicast group.

13. The communications device according to claim 8, wherein the first invocation parameter is specifically used for any one of the following:
invoking a multicast context user add service operation of the second network function; and
invoking a multicast context user delete service operation of the second network function.

14. The communications device according to claim 8, wherein the first invocation parameter further comprises at least one of the following:
multicast service information, wherein the multicast service information is received from the terminal;
quality of service capability information, wherein the quality of service capability information is received from the terminal; and
information about a radio access network RAN node serving the UE,
or,
wherein the multicast service information comprises at least one of the following:
a multicast service address;
a multicast group identifier; and
a uniform resource locator.

15. A communications device, applied to a second network function, comprising a memory, a processor, and a program stored in the memory and capable of running on the processor, wherein when the program is executed by the processor, the program causes the processor to implement the steps of the method for multicast service session operation;

sending a multicast service operation result to a terminal, wherein before the sending a multicast service operation result to a terminal, the method further comprises:

receiving a first invocation parameter sent by a first network function, wherein the first invocation parameter is used for invoking a multicast context service operation of the second network function, wherein the first network function is an access management function (AMF) or a session management function (SMF); and the second network function is a multicast broadcast session management (MBSF) or a network function integrating the MBSF and a multicast broadcast policy control function (MBPCF); and the third network function is the MBPCF;

wherein the sending the multicast service operation result to the terminal comprises:

sending the multicast service operation result to the terminal via the first network function;

wherein the first invocation parameter comprises:

operation type indication information, wherein the operation type indication information is used to indicate any one of the following: user add, user delete, multicast session establishment, and multicast session release.

16. The communications device according to claim 15, wherein the first invocation parameter is specifically used for any one of the following:

invoking a multicast context user add service operation of the second network function; and invoking a multicast context user delete service operation of the second network function, or, wherein the request comprising multicast service information comprises any one of the following:

a multicast session establishment request message; and a multicast session release request message.

17. The communications device according to claim 15, The method further comprising:

subscribing terminal message notifications from an access management function; or sending a radio session request message to a RAN node, wherein the radio session request message comprises at least one of the following:

security information;

multicast service information;

user plane function information;

a multicast group identifier;

a multicast tunnel identifier; and information for creating or updating a radio resource.

* * * * *